(12) United States Patent
Zhang et al.

(10) Patent No.: US 11,715,004 B2
(45) Date of Patent: Aug. 1, 2023

(54) ROBUSTNESS AGAINST MANIPULATIONS IN MACHINE LEARNING

(71) Applicant: Microsoft Technology Licensing, LLC, Redmond, WA (US)

(72) Inventors: Cheng Zhang, Cambridge (GB); Yingzhen Li, Cambridge (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 1056 days.

(21) Appl. No.: 16/508,281

(22) Filed: Jul. 10, 2019

(65) Prior Publication Data
US 2020/0394512 A1 Dec. 17, 2020

(51) Int. Cl.
*G06N 3/08* (2023.01)
*G06N 3/04* (2023.01)
*G06N 7/02* (2006.01)
*G06V 10/80* (2022.01)
*G06V 10/82* (2022.01)

(52) U.S. Cl.
CPC ............... *G06N 3/08* (2013.01); *G06N 3/04* (2013.01); *G06N 7/023* (2013.01); *G06T 2207/20081* (2013.01); *G06V 10/811* (2022.01); *G06V 10/82* (2022.01)

(58) Field of Classification Search
CPC ........... G06N 3/08; G06N 3/04; G06N 7/023; G06V 10/82; G06V 10/811; G06T 2207/20081
See application file for complete search history.

(56) References Cited

U.S. PATENT DOCUMENTS

| | | | |
|---|---|---|---|
| 2018/0137389 A1* | 5/2018 | Mathieu | G06N 3/0445 |
| 2019/0251952 A1* | 8/2019 | Arik | G10L 13/027 |
| 2020/0184955 A1* | 6/2020 | Patel | G10L 15/22 |

OTHER PUBLICATIONS

Lee et al. "Estimation of Individual Treatment Effect In Latent Confounder Models via Adversarial Learning", arXiv preprint arXiv:1811.08943 (2018). (Year: 2018).*

(Continued)

*Primary Examiner* — Vu Le
*Assistant Examiner* — Julius Chai
(74) *Attorney, Agent, or Firm* — Barta, Jones & Foley, PLLC

(57) ABSTRACT

A method comprising: receiving observed data points each comprising a vector of feature values, wherein for each data point, the respective feature values are values of different features of a feature vector. Each observed data point represents a respective observation of a ground truth as observed in the form of the respective values of the feature vector. The method further comprises learning parameters of a machine-learning model based on the observed data points. The machine-learning model comprises one or more statistical models arranged to model a causal relationship between the feature vector and a latent vector, a classification, and a manipulation vector. The manipulation vector represents an effect of potential manipulations occurring between the ground truth and the observation thereof as observed via the feature vector. The learning comprises learning parameters of the one or more statistical models to map between the feature vector, latent vector, classification and manipulation vector.

20 Claims, 19 Drawing Sheets

(56) References Cited

OTHER PUBLICATIONS

Kocaoglu, Murat, et al. "Causalgan: Learning causal implicit generative models with adversarial training." arXiv preprint arXiv:1709.02023 (2017). (Year: 2017).*

Song, Yang, et al. "Pixeldefend: Leveraging generative models to understand and defend against adversarial examples." arXiv preprint arXiv:1710.10766 (2017). (Year: 2017).*

Schott, Lukas, et al. "Towards the first adversarially robust neural network model on MNIST." arXiv preprint arXiv:1805.09190 (2018). (Year: 2018).*

Samangouei, Pouya, Maya Kabkab, and Rama Chellappa. "Defense-gan: Protecting classifiers against adversarial attacks using generative models." arXiv preprint arXiv:1805.06605 (2018). (Year: 2018).*

Madry, Aleksander, et al. "Towards deep learning models resistant to adversarial attacks." arXiv preprint arXiv:1706.06083 (2017). (Year: 2017).*

Kocaoglu, et al., "CausalGAN: Learning Causal Implicit Generative Models with Adversarial Training", In Repository of arXiv:1709.02023v2, Sep. 14, 2017, pp. 1-37.

Lee, et al., "Estimation of Individual Treatment Effect in Latent Confounder Models via Adversarial Learning", In Repository of arXiv:1811.089431, Nov. 21, 2018, pp. 1-9.

"International Search Report and Written Opinion Issued in PCT Application No. PCT/US20/030167", dated Jul. 29, 2020, 12 Pages.

"Blind Review and Rejections of—A Causal View on Robustness of Neural Networks", Retrieved From: https://openreview.net/forum?id=Hkxvl0EtDH, Jun. 19, 2020, 5 Pages.

Zhang, et al., "A Causal View on Robustness of Neural Networks", Retrieved From: https://openreview.net/attachment?id=Hkxvl0EtDH&name=original_pdf, Dec. 24, 2019, pp. 1-17.

Peters, et al., "Elements of Causal Inference: Foundations and Learning Algorithms", Published by The MIT Press, 2017, 289 Pages.

Zhang, et al., "A Causal View on Robustness of Neural Networks", In Proceedings of the Proceedings of the 36th International Conference on Machine Learning, Jun. 2019, 10 Pages.

"Are generative classifiers more robust to adversarial attacks?", In Repository of arXiv:1802.06552, Feb. 19, 2018, 07 Pages.

"Non Povisional Application Filed in U.S. Appl. No. 16/443,788", filed Jun. 17, 2019, 53 Pages.

"Non Provisional Application Filed in U.S. Appl. No. 16/443,734", filed Jun. 17, 2019, 52 Pages.

Aliferis, et al., "Local causal and markov blanket induction for causal discovery and feature selection for classification part i: Algorithms and empirical evaluation", In Journal of Machine Learning Research, Jan. 11, 2010, pp. 171-234.

Alzantot, et al., "Generating natural language adversarial examples", In Repository of arXiv:1804.07998, Apr. 21, 2018, 08 Pages.

Athalye, et al., "Obfuscated gradients give a false sense of security: Circumventing defenses to adversarial examples", In Repository of arXiv:1802.00420, Jul. 31, 2018, 12 Pages.

Carlini, et al., "Adversarial examples are not easily detected: Bypassing ten detection methods", In Proceedings of the 10th ACM Workshop on Artificial Intelligence and Security., Nov. 3, 2017, pp. 3-14.

Carlini, et al., "Audio adversarial examples: Targeted attacks on speech-to-text", In Proceedings of IEEE Security and Privacy Workshops, May 24, 2018, 07 Pages.

Carlini, "Towards evaluating the robustness of neural networks", In Proceedings of IEEE Symposium on Security and Privacy, May 22, 2017, pp. 39-57.

Chen, et al., "Isolating sources of disentanglement in variational autoencoders", In Proceedings of 32nd Conference an Neural Information Processing Systems, Dec. 2, 2018, pp. 2610-2620.

Goodfellow, et al., "Explaining and harnessing adversarial examples", In Proceedings of 3rd International Conference on Learning Representations, May 7, 2015, 11 Pages.

Gopnik, et al., "A theory of causal learning in children: causal maps and bayes nets", In Journal of Psychological review, vol. 111, Issue 1, Jan. 1, 2004, pp. 3-32.

Higgins, et al., "beta-vae: Learning basic visual concepts with a constrained variational framework", In Proceedings of 5th International Conference on Learning Representations, Apr. 24, 2017, 13 Pages.

Kim, et al., "Disentangling by factorising", In Proceedings of the 35th International Conference on Machine Learning, Jul. 10, 2018, pp. 2654-2663.

Kingma, et al., "Auto-encoding variational bayes", In Repository of arXiv:1312.6114, Dec. 20, 2013, 09 Pages.

Kurakin, et al., "Adversarial examples in the physical world", In Repository of arXiv:1607.02533, Jul. 8, 2016, 15 Pages.

Lee, et al., "A Simple Unified Framework for Detecting Out-of-Distribution Samples and Adversarial Attacks", In Proceedings of 32nd Conference on Neural Information Processing System, Dec. 2, 2018, pp. 7167-7177.

Li, et al., "Disentangled sequential autoencoder", In Proceedings of the 35th International Conference on Machine Learning, Jul. 10, 2018, 12 Pages.

Madry, et al., "Towards deep learning models resistant to adversarial attacks", In Repository of arXiv:1706.06083, Jun. 19, 2017, 22 Pages.

Narayanaswamy, "Learning Disentangled Representations with Semi-Supervised Deep Generative Models", In Advances in Neural Information Processing Systems, Dec. 4, 2017, pp. 5925-5935.

Papernot, et al., "Practical black-box attacks against machine learning", In Proceedings of the ACM on Asia Conference on Computer and Communications Security, Apr. 2, 2017, pp. 506-519.

Zhao, et al., "On learning invariant representation for domain adaptation", In Repository of arXiv:1901.09453v1, Jan. 29, 2019, 19 Pages.

Zhang, et al., "Domain adaptation under target and conditional shift", In Proceedings of the 30th International Conference on International Conference on Machine Learning, Jun. 16, 2013, pp. 819-827.

Perez, et al., "The effectiveness of data augmentation in image classification using deep learning", In Repository of arXiv:1712.04621, Dec. 13, 2017, 08 Pages.

Zhang, et al., "Advances in Variational Inference", In repository of arXiv, arXiv:1711.05597, Oct. 23, 2018, 23 Pages.

Rezende, et al., "Stochastic Backpropagation and Approximate Inference in Deep Generative Models", In Proceedings of the 31st International Conference on International Conference on Machine Learning, vol. 32, Jun. 21, 2014, 9 Pages.

Samangouei, et al., "Defense-GAN: Protecting classifiers against adversarial attacks using generative models", In Proceedings of 6th International Conference on Learning Representation, Apr. 30, 2018, 17 Pages.

Schott, et al., "Towards the first adversarially robust neural network model on MNIST", In Repository of arXiv:1805.09190, Sep. 20, 2018, 16 Pages.

Song, et al., "Pixeldefend: Leveraging generative models to understand and defend against adversarial examples", In Proceedings of 6th International Conference on Learning Representations, Apr. 30, 2018.

Spirtes, et al., "Causation, prediction, and search", In MIT Press, 2000, 546 Pages.

Stojanov, et al., "Data-driven approach to multiple-source domain adaptation", In Proceedings of 22nd International Conference on Artificial Intelligence and Statistics, Apr. 16, 2019, pp. 3487-3496.

Szegedy, et al., "Intriguing properties of neural networks", In Proceedings of 2nd International Conference on Learning Representations, Apr. 14, 2014, 10 Pages.

Tramer, et al., "Ensemble adversarial training: Attacks and defenses", In Repository of arXiv:1705.07204, Jul. 22, 2018,

* cited by examiner

- - - → Inference
———→ Generative

☐ Training phase
▒ Fine-tuning phase
▓ Both

A) DNN
B) Ours w/o FT train clean
C) Ours w/o FT train VT
D) Ours w/o FT train HT
E) Ours w FT train clean
F) Ours w FT train VT
G) Ours w HT train FT A) DNN
B) Ours w/o FT train clean
C) Ours w/o FT train VT
D) Ours w/o FT train HT
E) Ours w FT train clean
F) Ours w FT train VT
G) Ours w HT train FT

ROBUSTNESS AGAINST MANIPULATIONS IN MACHINE LEARNING

BACKGROUND

Neural networks are used in the field of machine learning and artificial intelligence (AI). A neural network comprises plurality of nodes which are interconnected by links, sometimes referred to as edges. The input edges of one or more nodes form the input of the network as a whole, and the output edges of one or more other nodes form the output of the network as a whole, whilst the output edges of various nodes within the network form the input edges to other nodes. Each node represents a function of its input edge(s) weighted by a respective weight, the result being output on its output edge(s). The weights can be gradually tuned based on a set of experience data (e.g. training data) so as to tend towards a state where the output of the network will output a desired value for a given input.

Typically the nodes are arranged into layers with at least an input and an output layer. A "deep" neural network comprises one or more intermediate or "hidden" layers in between the input layer and the output layer. The neural network can take input data and propagate the input data through the layers of the network to generate output data. Certain nodes within the network perform operations on the data, and the result of those operations is passed to other nodes, and so on.

FIG. 1(a) gives a simplified representation of an example neural network 108. The example neural network comprises multiple layers of nodes 104: an input layer 102i, one or more hidden layers 102h and an output layer 102o. In practice, there may be many nodes in each layer, but for simplicity only a few are illustrated. Each node is configured to generate an output by carrying out a function on the values input to that node. The inputs to one or more nodes form the input of the neural network, the outputs of some nodes form the inputs to other nodes, and the outputs of one or more nodes form the output of the network.

At some or all of the nodes of the network, the input to that node is weighted by a respective weight. A weight may define the connectivity between a node in a given layer and the nodes in the next layer of the neural network. A weight can take the form of a scalar or a probabilistic distribution. When the weights are defined by a distribution, as in a Bayesian model, the neural network can be fully probabilistic and captures the concept of uncertainty. The values of the connections 106 between nodes may also be modelled as distributions. This is illustrated schematically in FIG. 1(b). The distributions may be represented in the form of a set of samples or a set of parameters parameterizing the distribution (e.g. the mean $\mu$ and standard deviation $\sigma$ or variance $\sigma^2$).

The network learns by operating on data input at the input layer, and, based on the input data, adjusting the weights applied by some or all of the nodes in the network. There are different learning approaches, but in general there is a forward propagation through the network from left to right in FIG. 1(a), a calculation of an overall error, and a backward propagation of the error through the network from right to left in FIG. 1(a). In the next cycle, each node takes into account the back propagated error and produces a revised set of weights. In this way, the network can be trained to perform its desired operation.

The input to the network is typically a vector, each element of the vector representing a different corresponding feature. E.g. in the case of image recognition the elements of this feature vector may represent different pixel values, or in a medical application the different features may represent different symptoms. The output of the network may be a scalar or a vector. The output may represent a classification, e.g. an indication of whether a certain object such as an elephant is recognized in the image, or a diagnosis of the patient in the medical example.

FIG. 1(c) shows a simple arrangement in which a neural network is arranged to predict a classification based on an input feature vector. During a training phase, experience data comprising a large number of input data points is supplied to the neural network, each data point comprising an example set of values for the feature vector, labelled with a respective corresponding value of the classification (e.g. elephant or not elephant). Over many such example data points, the learning algorithm tunes the weights to reduce the overall error in the network. Once trained with a suitable number of data points, a target feature vector can then be input to the neural network without a label, and the network can instead predict the value of the classification based on the input feature values and the tuned weights.

Training in this manner is sometimes referred to as a supervised approach. Other approaches are also possible, such as a reinforcement approach wherein the network each data point is not initially labelled. The learning algorithm begins by guessing the corresponding output for each point, and is then told whether it was correct, gradually tuning the weights with each such piece of feedback. Another example is an unsupervised approach where input data points are not labelled at all and the learning algorithm is instead left to infer its own structure in the experience data.

An issue with a machine-learning model as illustrated in FIG. 1(c) is robustness against manipulations in the input data. For instance, if the input vector X represents an image, the image could be rotated or shifted laterally. This may result in the neural network failing to output a classification Y that correctly reflects the ground truth behind the image (e.g. the actual object being captured in the image). Manipulations can even be exploited by a malicious third party in a manipulation attack, in an attempt to deliberately fool the neural network. For instance they could be used to bypass a facial recognition, or cause the neural network to misclassify an animal, or to prevent copyrighted or illegal content being found in an automated AI online search, or cause an autonomous vehicle to incorrectly read a road sign, etc.

To address this, conventionally an approach referred to as "adversarial training" is used in the training phase. This means that as well as "clean" data without the manipulations, the training data also comprises a number of further examples that do include one or more anticipated manipulations, such as a rotation. So in the image recognition case by way of example, the neural network can thus learn not only to recognize the object the right way up, but also from a range of different angles.

SUMMARY

However, the present disclosure recognizes an issue with the adversarial training approach. Namely, while this can make the trained neural network better at coping with the anticipated manipulations that were included in the training data, it can in fact make the neural network perform worse when it comes to unseen manipulations (i.e. unanticipated manipulations that were unseen in the sense that they were not included in the training data set). That is, the classification will have a lower chance of being correct if the input vector contains an unforeseen manipulation. The reason is that the neural network over-fits to the anticipated manipulations in the adversarial training data, making it less able to generalize to other, unanticipated manipulations. So for instance whilst the neural network may be explicitly trained to recognize different rotations, it may become less able to correctly classify images containing lateral shifts or different lighting conditions.

Furthermore, the adversarial approach becomes a game of "cat and mouse" between trainer and the attacker: each time a new manipulation attack is recognized by the trainer, they will re-train the model to deal with that manipulation; but then when the attacker discovers that this attack no longer works, they will try another new attack based on a new form of manipulation, and so forth.

It is disclosed herein that an alternative or additional approach could be beneficial in order to mitigate this issue. Ideally a machine-learning model algorithm should be robust against all possible manipulations, or at least as many as possible. This is not currently possible using only the adversarial training method.

Humans have the ability to generalize to previously unseen manipulations because they have the ability of causal reasoning. For instance a child can recognize an elephant from an angle from which he/she has never seen an elephant before, or in unusual lighting conditions that he/she has never seen an elephant in before. The reason is that the human mind is able to account for the cause behind the form of the observed image, e.g. recognizing the lighting conditions as a cause of the form of the observation rather than an inherent property of the ground truth being observed (the inherent properties being for example trunk, wrinkly skin, etc. in the example of an elephant). Inspired by this, there is disclosed herein a new form of machine-learning model that is based on a model of the causal relationship between the observed feature vector and possible manipulations affecting those observations, as well as the inherent latent properties of that which is being observed.

According to one aspect disclosed herein, there is provided a computer-implemented method of machine learning. The method comprises: receiving a plurality of observed data points each comprising a respective vector of feature values, wherein for each observed data point, the respective feature values are values of a plurality of different features of a feature vector. Each observed data point represents a respective observation of a ground truth as observed in the form of the respective values of the feature vector. The method further comprises: learning parameters of a machine-learning model based on the observed data points, wherein the machine-learning model comprises one or more statistical models arranged to model a causal relationship between the feature vector and a latent vector, a classification, and a manipulation vector. The manipulation vector represents an effect of potential manipulations occurring between the ground truth and the observation of the group truth as observed via said feature vector. The learning comprises learning parameters of the one or more statistical models to map between the feature vector, latent vector, classification and manipulation vector.

The one or more statistical models are arranged to model a causal relationship between the feature vector and the classification, latent vector and manipulation vector. In the case where the machine-learning model comprises one or more generative models, this means that the generative model(s) map from the classification, latent vector and manipulation vector as inputs (causes) to the feature vector as an output (result or effect of the causes). In the case of one or more inference models, reflecting the causal relationship in an inference model may mean that one of the one or more inference models maps from the feature vector as an input to the manipulation vector as an output; and/or that one of the one or more inference models maps from the feature vector, classification and manipulation vector as an input to the latent vector as an output.

In embodiments, the training data comprises at least two groups of data points: a first group which does not include the manipulation(s), and a second group which does. E.g. the first group may be used in an initial training phase and the second group may be collected during a testing phase or during actual deployment of the model "in-the-field". When learning based on the first group of data points, the manipulation vector is set to a null value (e.g. all its elements set to zero). Furthermore, the parameters (e.g. weights) of only one or more first parts of the machine-learning model not specifically modelling the causal relationship with the manipulation vector are learned, whilst the parameters (e.g. weights) of one or more other, second parts of the machine-learning model that are dedicated to modelling the causal relationship are fixed (i.e. not tuned during learning). On the other hand, when learning based on the second group of data points (that do include the effect of the manipulation), then if the manipulation is known the manipulation vector is set to a value representing the known manipulation, or otherwise the manipulation vector is left to be inferred during learning. Furthermore, the parameters of at least the one or more second parts of the machine-learning model are allowed to be learned when learning based on the second group of data points (whilst the one or more first parts are fixed, or learned as well in parallel, or a combination such at least one first part is fixed whilst the parameters of another first part are learned).

Thus the machine-learning model can learn to disentangle the effect of manipulations from the effect of the ground truth (i.e. the true fact of what is actually being observed). The authors of the present disclosure have found that improves performance even when the model is subsequently asked to make predictions based on input data that includes unseen manipulations, i.e. that were not included in either the first or second groups of experience data. The disclosed model thus provides improved robustness against unanticipated manipulations, unlike the adversarial training approach when used alone.

However, even if the separate first and second groups of data points are not used to explicitly teach the disentanglement, improved robustness is still achieved. The authors have found that even the mere fact of arranging an additional vector relative to the feature vector according to a causal model, modelling a causal relationship with the feature vector, will still provide a degree of improved robustness to unseen manipulations.

BRIEF DESCRIPTION OF THE DRAWINGS

To assist understanding of embodiments of the present disclosure and to illustrate how such embodiments may be put into effect, reference is made, my way of example only, to the accompanying drawings in which:

FIG. 9(b) shows the training data without manipulation.

DETAILED DESCRIPTION OF EMBODIMENTS

The following will present a causal view on the robustness of neural networks against input manipulations, which applies not only to traditional classification tasks but also to general measurement data. Based on this view, embodiments provide a design of a deep causal manipulation augmented model (termed herein deep CAMA) which explicitly models the manipulations of data as a cause to the observed effect variables. Embodiments further develop data augmentation and test-time fine-tuning methods to improve deep CAMA's robustness. When compared with discriminative deep neural networks, the disclosed model shows superior robustness against unseen manipulations (i.e. manipulations that were not present in the training data). As a by-product, in embodiments the model also achieves disentangled representation which separates the representation of manipulations from those of other latent causes.

First however there is described an example system in which the presently disclosed techniques may be implemented. There is also provided an overview of the principles behind neural networks and variational auto encoders, based upon which embodiments may be built or expanded.

Figure 2:
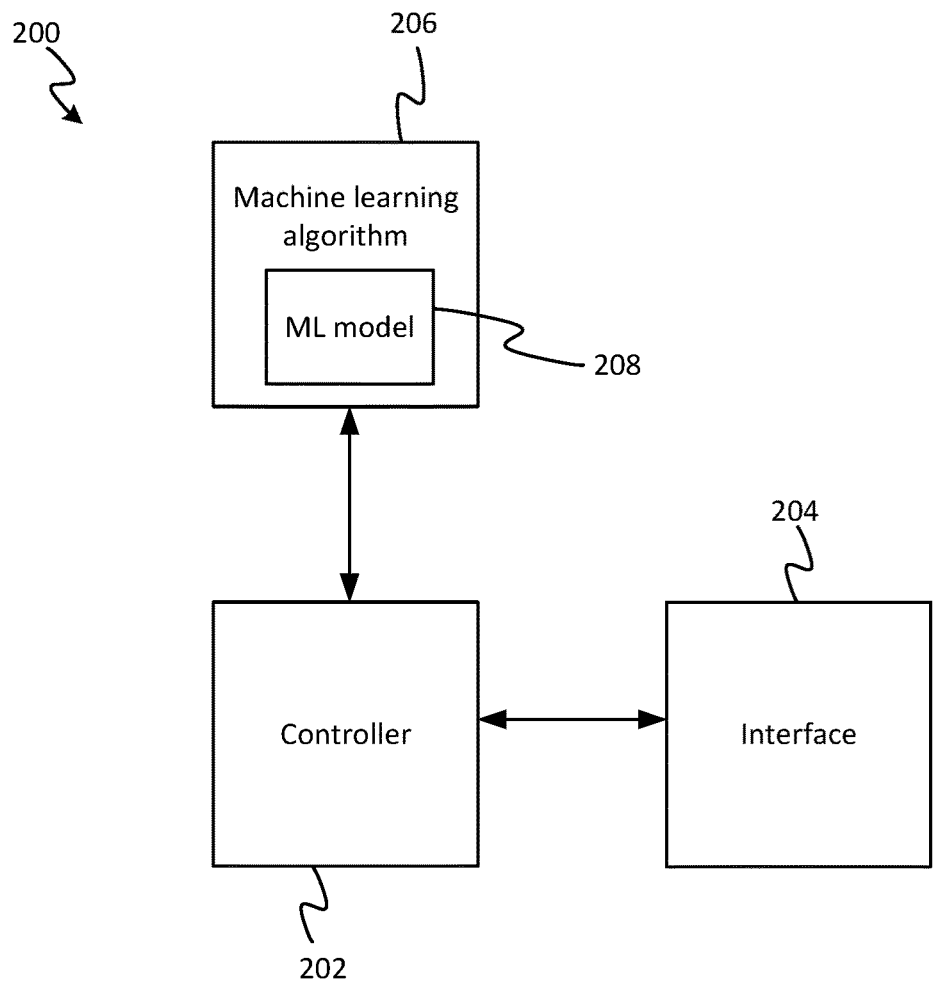
FIG. 2 is a schematic illustration of a computing apparatus for implementing a neural network.

FIG. 2 illustrates an example computing apparatus 200 for implementing an artificial intelligence (AI) algorithm including a machine-learning model in accordance with embodiments described herein. The computing apparatus 200 may take the form of a user terminal such as a desktop computer, laptop computer, tablet, smartphone, wearable smart device such as a smart watch, or an on-board computer of a vehicle such as car, etc. Additionally or alternatively, the computing apparatus 200 may comprise a server. A server herein refers to a logical entity which may comprise one or more physical server units located at one or more geographic sites. Where required, distributed or "cloud" computing techniques are in themselves known in the art. The one or more user terminals and/or the one or more server units of the server may be connected to one another via a packet-switched network, which may comprise for example a wide-area internetwork such as the Internet, a mobile cellular network such as a 3GPP network, a wired local area network (LAN) such as an Ethernet network, or a wireless LAN such as a Wi-Fi, Thread or 6LoWPAN network.

The computing apparatus 200 comprises at least a controller 202, an interface (e.g. a user interface) 204, and an artificial intelligence (AI) algorithm 206. The controller 202 is operatively coupled to each of the interface 204 and the AI algorithm 206.

Each of the controller 202, interface 204 and AI algorithm 206 may be implemented in the form of software code embodied on computer readable storage and run on processing apparatus comprising one or more processors such as CPUs, work accelerator co-processors such as GPUs, and/or other application specific processors, implemented on one or more computer terminals or units at one or more geographic sites. The storage on which the code is stored may comprise one or more memory devices employing one or more memory media (e.g. electronic or magnetic media), again implemented on one or more computer terminals or units at one or more geographic sites. In embodiments, one, some or all the controller 202, interface 204 and AI algorithm 206 may be implemented on the server. Alternatively, a respective instance of one, some or all of these components may be implemented in part or even wholly on each of one, some or all of the one or more user terminals. In further examples, the functionality of the above-mentioned components may be split between any combination of the user terminals and the server. Again it is noted that, where required, distributed computing techniques are in themselves known in the art. It is also not excluded that one or more of these components may be implemented in dedicated hardware.

The controller 202 comprises a control function for coordinating the functionality of the interface 204 and the AI algorithm 206. The interface 204 refers to the functionality for receiving and/or outputting data. The interface 204 may comprise a user interface (UI) for receiving and/or outputting data to and/or from one or more users, respectively; or it may comprise an interface to a UI on another, external device. Alternatively the interface may be arranged to collect data from and/or output data to an automated function implemented on the same apparatus or an external device. In the case of an external device, the interface 204 may comprise a wired or wireless interface for communicating, via a wired or wireless connection respectively, with the external device. The interface 204 may comprise one or more constituent types of interface, such as voice interface, and/or a graphical user interface. The interface 204 may present a UI front end to the user(s) through one or more I/O modules on their respective user device(s), e.g. speaker and microphone, touch screen, etc., depending on the type of user interface. The logic of the interface may be implemented on a server and output to the user through the I/O module(s) on his/her user device(s). Alternatively some or all of the logic of the interface 204 may also be implemented on the user device(s) 102 its/themselves.

The controller 202 is configured to control the AI algorithm 206 to perform operations in accordance with the embodiments described herein. It will be understood that any of the operations disclosed herein may be performed by the AI algorithm 206, under control of the controller 202 to collect experience data from the user and/or an automated process via the interface 204, pass it to the AI algorithm 206, receive predictions back from the AI algorithm and output the predictions to the user and/or automated process through the interface 204.

The AI algorithm 206 comprises a machine-learning model 208, comprising one or more constituent statistical models such as one or more neural networks.

Figure 1A:
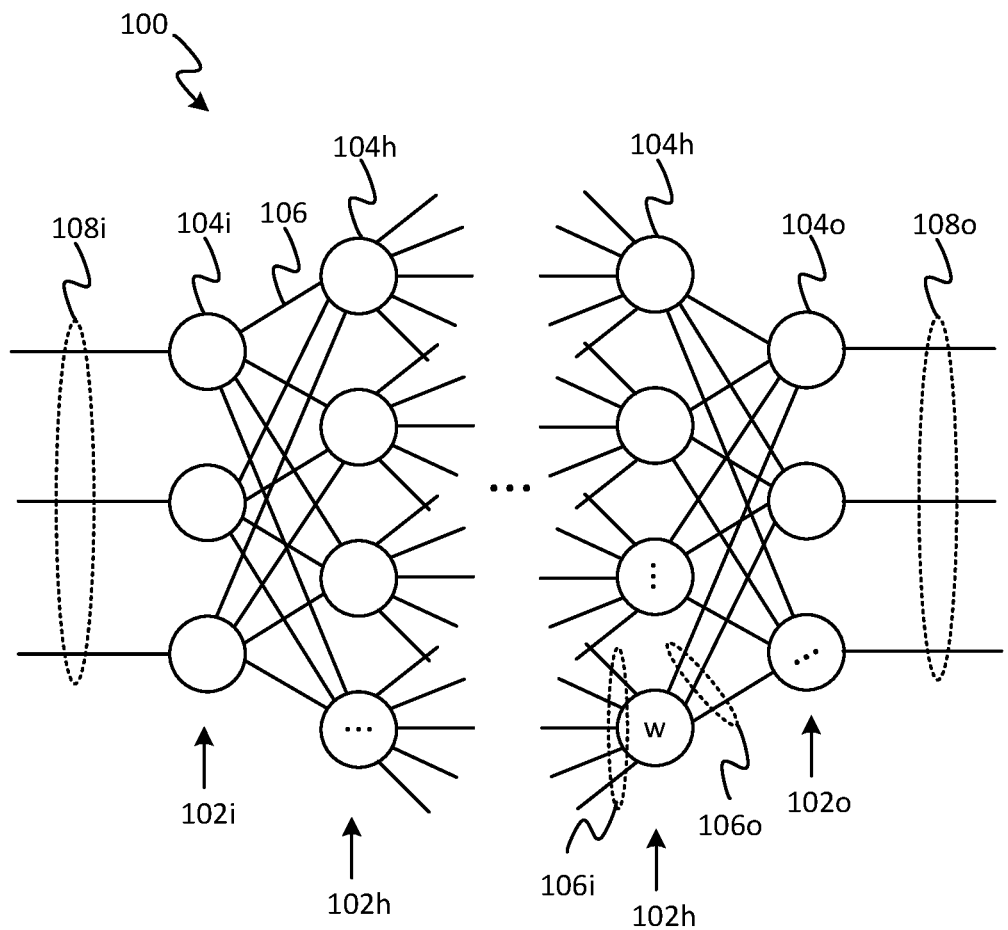
FIG. 1(a) is a schematic illustration of a neural network.

FIG. 1(a) illustrates the principle behind a neural network. A neural network 100 comprises a graph of interconnected nodes 104 and edges 106 connecting between nodes, all implemented in software. Each node 104 has one or more input edges and one or more output edges, with at least some of the nodes 104 having multiple input edges per node, and at least some of the nodes 104 having multiple output edges per node. The input edges of one or more of the nodes 104 form the overall input 108$i$ to the graph (typically an input vector, i.e. there are multiple input edges). The output edges of one or more of the nodes 104 form the overall output 108$o$ of the graph (which may be an output vector in the case where there are multiple output edges). Further, the output edges of at least some of the nodes 104 form the input edges of at least some others of the nodes 104.

Each node 104 represents a function of the input value(s) received on its input edges(s) 106$i$, the outputs of the function being output on the output edge(s) 106$o$ of the respective node 104, such that the value(s) output on the output edge(s) 106$o$ of the node 104 depend on the respective input value(s) according to the respective function. The function of each node 104 is also parametrized by one or more respective parameters w, sometimes also referred to as weights (not necessarily weights in the sense of multiplicative weights, though that is certainly one possibility). Thus the relation between the values of the input(s) 106$i$ and the output(s) 106$o$ of each node 104 depends on the respective function of the node and its respective weight(s).

Figure 1B:
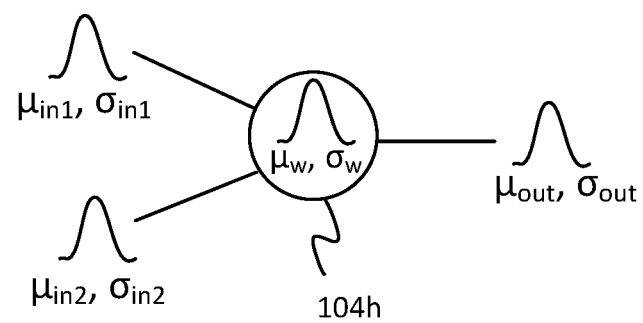
FIG. 1(b) is a schematic illustration of a neural network arranged to predict a classification based on an input feature vector.

Each weight could simply be a scalar value. Alternatively, as shown in FIG. 1(b), at some or all of the nodes 104 in the network 100, the respective weight may be modelled as a probabilistic distribution such as a Gaussian. In such cases the neural network 100 is sometimes referred to as a Bayesian neural network. Optionally, the value input/output on each of some or all of the edges 106 may each also be modelled as a respective probabilistic distribution. For any given weight or edge, the distribution may be modelled in terms of a set of samples of the distribution, or a set of parameters parameterizing the respective distribution, e.g. a pair of parameters specifying its centre point and width (e.g. in terms of its mean $\mu$ and standard deviation $\sigma$ or variance $\sigma^2$).

As shown in FIG. 1(a), the nodes 104 of the neural network 100 may be arranged into a plurality of layers, each layer comprising one or more nodes 104. In a so-called "deep" neural network, the neural network 100 comprises an input layer 102$i$ comprising one or more input nodes 104$i$, one or more hidden layers 102$h$ (also referred to as inner layers) each comprising one or more hidden nodes 104$h$ (or inner nodes), and an output layer 102$o$ comprising one or more output nodes 104$o$. For simplicity, only two hidden layers 102$h$ are shown in FIG. 1(a), but many more may be present.

The different weights of the various nodes 104 in the neural network 100 can be gradually tuned based on a set of experience data (e.g. training data), so as to tend towards a state where the output 108$o$ of the network will produce a desired value for a given input 108$i$. For instance, before being used in an actual application, the neural network 100 may first be trained for that application. Training comprises inputting experience data in the form of training data to the inputs 108$i$ of the graph and then tuning the weights w of the nodes 104 based on feedback from the output(s) 108$o$ of the graph. The training data comprises multiple different input data points, each comprising a value or vector of values corresponding to the input edge or edges 108$i$ of the graph 100.

Figure 1C:
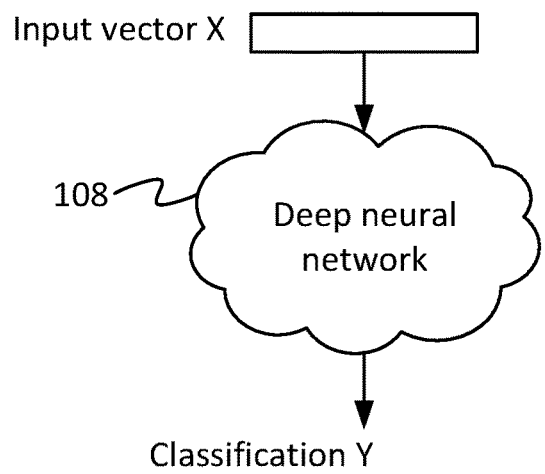
FIG. 1(c) is a schematic illustration of a node of a Bayesian neural network.

For instance, consider a simple example as in FIG. 1(c) where the machine-learning model comprises a single neural network 100, arranged to take a feature vector X as its input 108$i$ and to output a classification Y as its output 108$o$. The input feature vector X comprises a plurality of elements $x_d$, each representing a different feature d=0, 1, 2, ... etc. E.g. in the example of image recognition, each element of the feature vector X may represent a respective pixel value. For instance one element represents the red channel for pixel (0,0); another element represents the green channel for pixel (0,0); another element represents the blue channel of pixel (0,0); another element represents the red channel of pixel (0,1); and so forth. As another example, where the neural network is used to make a medical diagnosis, each of the elements of the feature vector may represent a value of a different symptom of the subject, or physical feature of the subject or other fact about the subject (e.g. body temperature, blood pressure, etc.).

Figure 3:
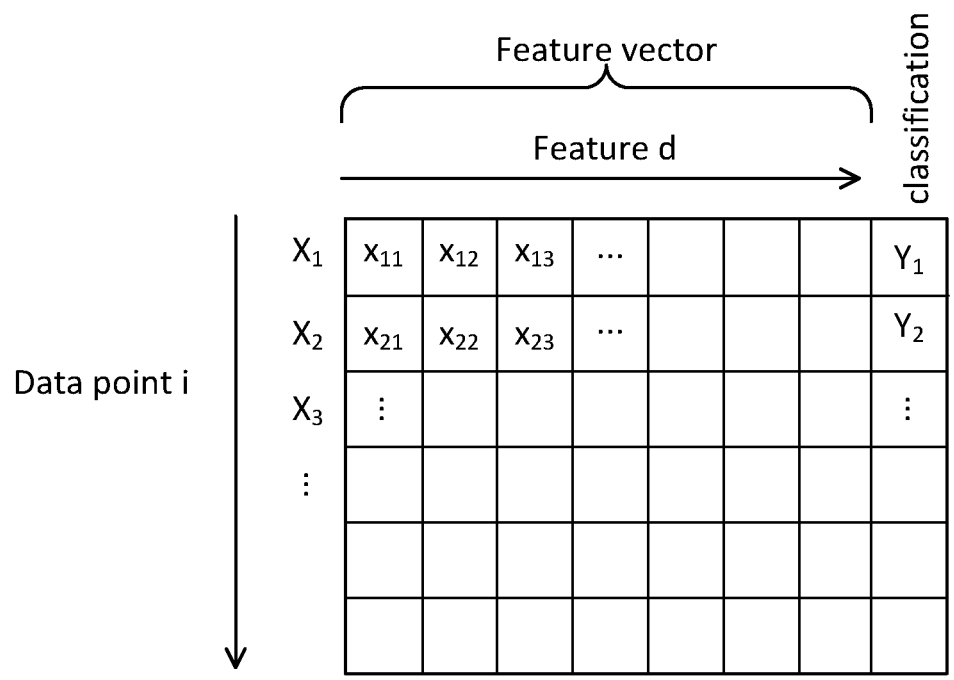
FIG. 3 schematically illustrates a data set comprising a plurality of data points each comprising one or more feature values.

FIG. 3 shows an example data set comprising a plurality of data points i=0, 1, 2, ... etc. Each data point i comprises a respective set of values of the feature vector (where $x_{id}$ is the value of the dth feature in the ith data point). The input feature vector $X_i$ represents the input observations for a given data point, where in general any given observation i may or may not comprise a complete set of values for all the elements of the feature vector X. The classification $Y_i$ represents a corresponding classification of the observation i. In the training data an observed value of classification $Y_i$ is specified with each data point along with the observed values of the feature vector elements (the input data points in the training data are said to be "labelled" with the classification $Y_i$). In subsequent a prediction phase, the classification Y is predicted by the neural network 100 for a further input observation X.

The classification Y could be a scalar or a vector. For instance in the simple example of the elephant-recognizer, Y could be a single binary value representing either elephant or not elephant, or a soft value representing a probability or confidence that the image comprises an image of an elephant. Or similarly of the neural network 100 is being used to text for a particular condition, Y could be a single binary value representing whether the subject has the condition or not, or a soft value representing a probability or confidence that the subject has the condition in question. As another example, Y could comprise a "1-hot" vector, where each element represents a different animal or condition. E.g. Y=[1, 0, 0, . . . ] represents an elephant, Y=[0, 1, 0, . . . ] represents an hippopotamus, Y=[0, 0, 1, . . . ] represents a rhinoceros, et. Or if soft values are used, Y=[0.81, 0.12, 0.05, . . . ] represents an 81% confidence that the image comprises an image of an elephant, 12% confidence that it comprises an image of an hippopotamus, 5% confidence of a rhinoceros, etc.

In the training phase, the true value of Yi for each data point i is known. With each training data point i, the AI algorithm 206 measures the resulting output value(s) at the output edge or edges 108o of the graph, and uses this feedback to gradually tune the different weights w of the various nodes 108 so that, over many observed data points, the weights tend towards values which make the output(s) 108i (Y) of the graph 100 as close as possible to the actual observed value(s) in the experience data across the training inputs (for some measure of overall error). I.e. with each piece of input training data, the predetermined training output is compared with the actual observed output of the graph 302o. This comparison provides the feedback which, over many pieces of training data, is used to gradually tune the weights of the various nodes 104 in the graph toward a state whereby the actual output 108o of the graph will closely match the desired or expected output for a given input 108i. Examples of such feedback techniques include for instance stochastic back-propagation.

Once trained, the neural network 100 can then be used to infer a value of the output 108o (Y) for a given value of the input vector 108i (X), or vice versa.

Explicit training based on labelled training data is sometimes referred to as a supervised approach. Other approaches to machine learning are also possible. For instance another example is the reinforcement approach. In this case, the neural network 100 begins making predictions of the classification Yi for each data point i, at first with little or no accuracy. After making the prediction for each data point I (or at least some of them), the AI algorithm 206 receives feedback (e.g. from a human) as to whether the prediction was correct, and uses this to tune the weights so as to perform better next time. Another example is referred to as the unsupervised approach. In this case the AI algorithm receives no labelling or feedback and instead is left to infer its own structure in the experienced input data.

FIG. 1A is a simple example of the use of a neural network 100. In some cases, the machine-learning model 208 may comprise a structure of two or more constituent neural networks 100.

Figure 4:
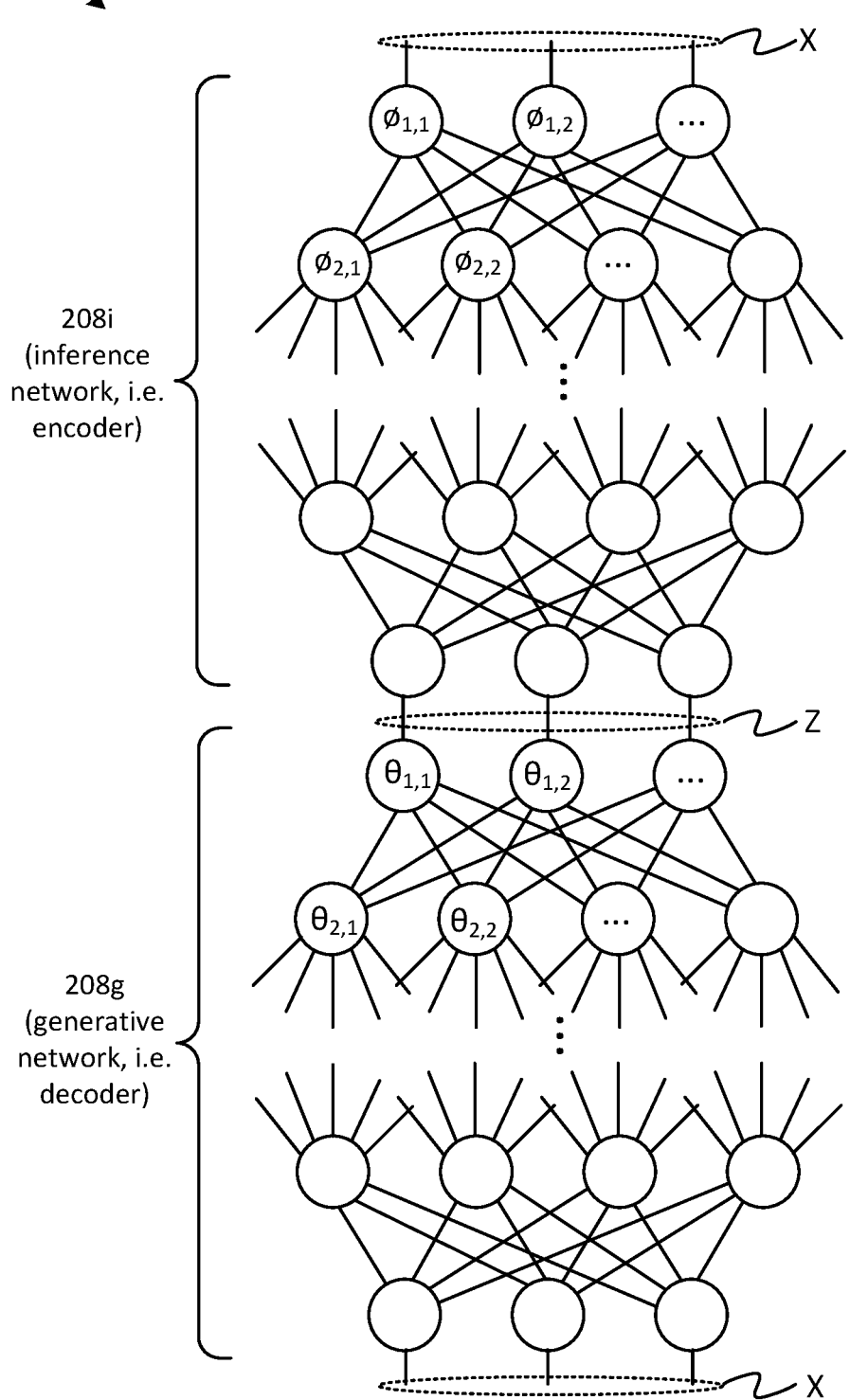
FIG. 4 is a schematic illustration of a variational auto encoder (VAE)

FIG. 4 schematically illustrates one such example, known as a variational auto encoder (VAE). In this case the machine learning model 208 comprises an encoder 208q comprising at least one inference network, and a decoder 208p comprising one or more generative networks. Each of the inference networks and the generative networks is an instance of a neural network 100, such as discussed in relation to FIG. 1(a). An inference network for the present purposes means a neural network arranged to encode an input into a latent representation of that input, and a generative network means a network arranged to at least partially decode from a latent representation.

The one or more inference networks are arranged to receive the observed feature vector X as an input and encode it into a latent vector Z (a representation in a latent space). The one or more generative networks 208p are arranged to receive the latent vector Z and decode back to the original feature space X.

The latent vector Z is a compressed (i.e. encoded) representation of the information contained in the input observations X. No one element of the latent vector Z necessarily represents directly any real world quantity, but the vector Z as a whole represents the information in the input data in compressed form. It could be considered conceptually to represent abstract features abstracted from the input data X, such as "wrinklyness of skin" and "trunk-like-ness" in the example of elephant recognition (though no one element of the latent vector can necessarily be mapped onto any one such factor, and rather the latent vector Z as a whole encodes such abstract information). The decoder 404 is arranged to decode the latent vector Z back into values in a real-world feature space, i.e. back to an uncompressed form representing the actual observed properties (e.g. pixel values).

The weights w of the one or more inference networks 208q are labelled herein ø, whilst the weights w of the one or more generative networks 208p are labelled θ. Each node 104 applies its own respective weight as illustrated in FIG. 3, but elsewhere herein the label ø generally may be used to refer to a vector of weights in one or more of the inference networks 208q, and θ to refer to a vector of weights in one or more of the generative networks 208p.

With each data point in the training data (or more generally each data point in the experience data during learning), the weights ø and θ are tuned so that the VAE 208 learns to encode the feature vector X into the latent space Z and back again. For instance, this may be done by minimizing a measure of divergence between qø(Zi|Xi) and pθ(Xi|Zi), where qø(Xi|Zi) is a function parameterised by ø representing a vector of the probabilistic distributions of the elements of Zi output by the encoder 208q given the input values of Xi, whilst pθ(Xi|Zi) is a function parameterized by θ representing a vector of the probabilistic distributions of the elements of Xi output by the encoder 208q given Zi. The symbol "|" means "given". The model is trained to reconstruct Xi and therefore maintains a distribution over Xi. At the "input side", the value of Xi is known, and at the "output side", the likelihood of Xi under the output distribution of the model is evaluated. The input values of X are sampled from the input data distribution. p(X|Z) is part of the model distribution, and the goal of the algorithm 206 is to make p(X) close to the input data distribution. p(X, Z) may be referred to as the model of the decoder, whilst p(Z|X) may be referred to as the posterior or exact posterior, and q(Z|X) as the approximate posterior. p(z) and q(z) may be referred to as priors.

For instance, this may be done by minimizing the Kullback-Leibler (KL) divergence between qø(Zi|Xi) and pθ(Xi|Zi). The minimization may be performed using an optimization function such as an ELBO (evidence lower bound) function, which uses cost function minimization based on gradient descent. However, in general other metrics and functions are also known in the art for tuning the encoder and decoder neural networks of a VAE.

The requirement to learn to encode to Z and back again amounts to a constraint placed on the overall neural network 208 of the VAE formed from the constituent neural networks 208q, 208p. This is the general principle of an autoencoder. The purpose of forcing the autoencoder to learn to encode and then decode a compressed form of the data, is that this can achieve one or more advantages in the learning compared to a generic neural network; such as learning to ignore noise in the input data, making better generalizations, or because when far away from a solution the compressed form gives better gradient information about how to quickly converge to a solution. In a variational autoencoder, the latent vector Z is subject to an additional constraint that it follows a predetermined form (type) of probabilistic distribution such as a multidimensional Gaussian distribution or gamma distribution.

Nonetheless, an issue with existing machine learning models is they are still not as robust as they might be against unseen manipulations, i.e. manipulations that were not included in the training data based upon which the model was trained (or more generally the experience data based upon which the weights were learned). Refer again to the discussion in the Background and Summary sections.

To address this, the present disclosure provides a machine learning model that accounts for the causal relation between manipulations and observations.

Figure 8:
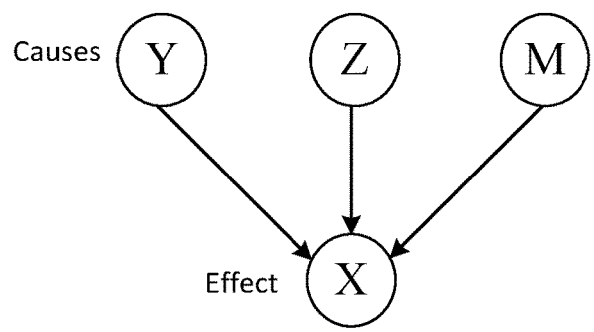
FIG. 8 shows an example of a causal model where observation X is the effect of class Y, latent factors Z and manipulation M.

Consider first a causal model as shown in FIG. 8. The observed values of the feature vector X (e.g. the image or the symptoms of the patient) may be considered to be an effect of at least three different causes: i) the ground truth represented by the classification Y (e.g. is the object in the image actually an elephant); ii) the latent properties that are represented by the latent vector Z (wrinklyness of skin, presence of a trunk, big ears, etc.); and iii) any manipulation(s) occurring between the ground truth in the real-world and the observation of the ground truth as captured in the observation X.

Derived from such a causal model, the present disclosure provides a new structure of machine-learning model 208 that includes an additional vector M, termed herein the manipulation vector, to model the causal effect of manipulation. The vector M is connected to the feature vector X by one or more statistical models (e.g. one or more neural networks) in a manner that reflects the causal relationship between M and X, as well as the causal relationship between Y and X, and between Z and X.

Figure 5:
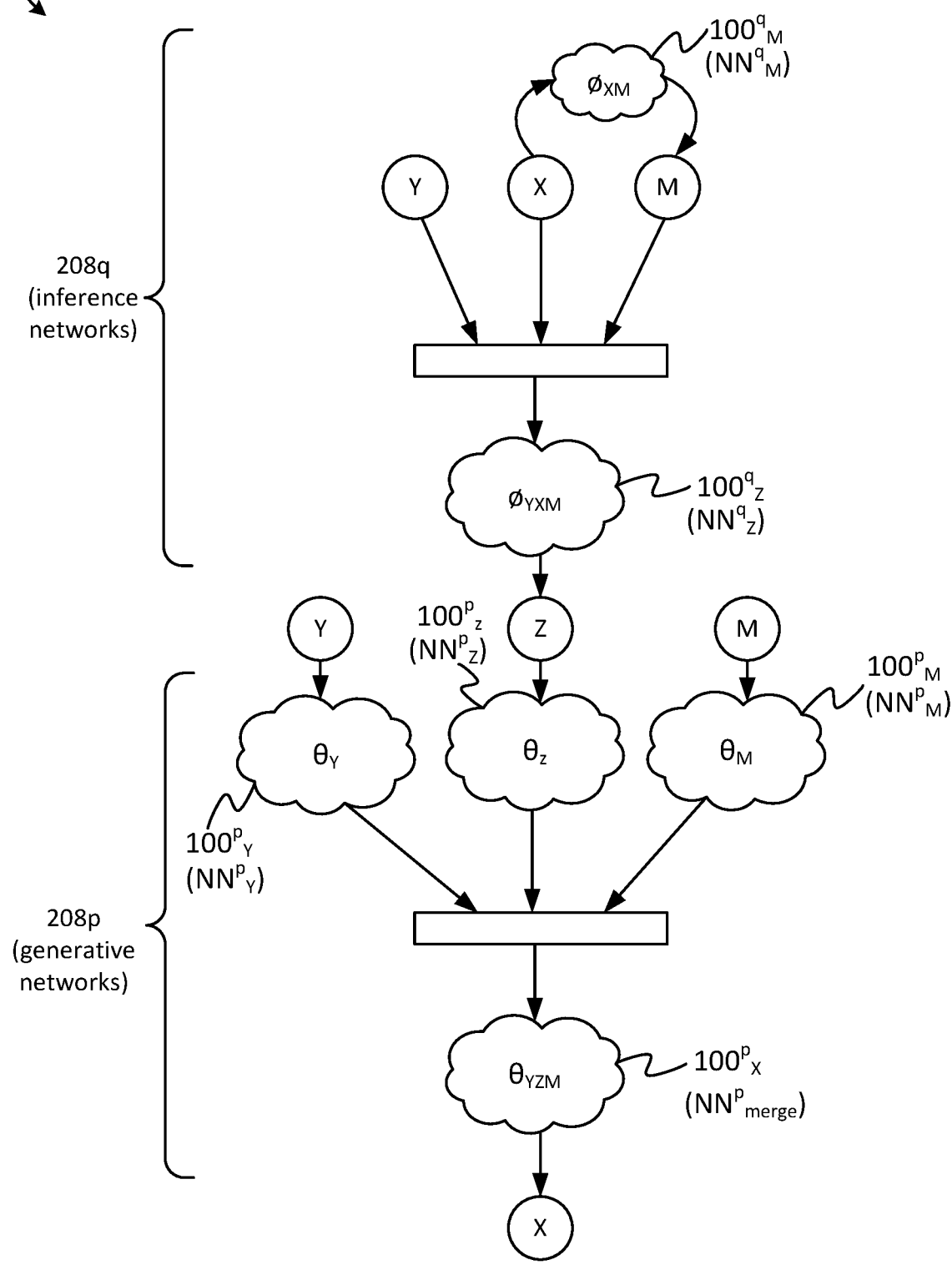
FIG. 5 schematically illustrates an example machine-learning model for modelling a causal effect of manipulations on feature values in accordance with an embodiment disclosed herein.
Figure 9:
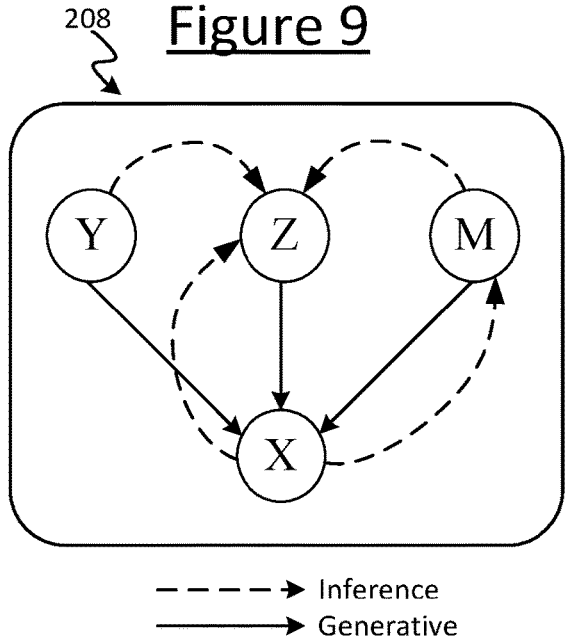
FIG. 9 is a graphical representation of an example of a causally consistent deep generative model in accordance with embodiments disclosed herein.
Figure 10:
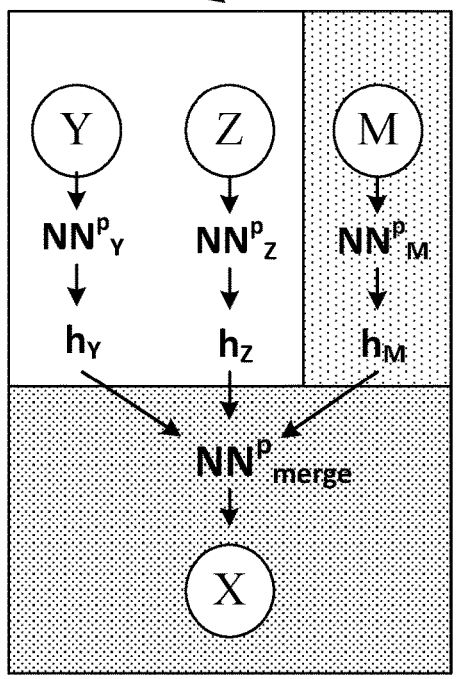
FIG. 10 schematically illustrates an example network architecture in accordance with embodiments disclosed herein.
Figure 10:
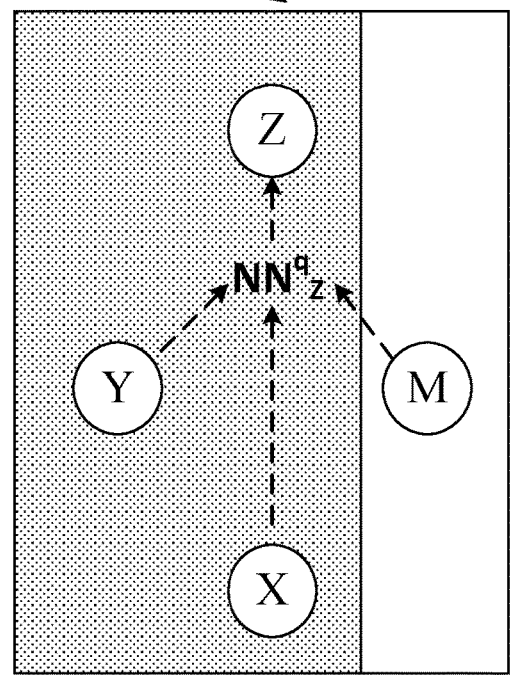

An example of such a machine-learning model is illustrated schematically in FIGS. 5 and 9. FIG. 9 gives a high-level schematic representation. In FIG. 10, a dashed line represents an inference network and a solid line represents a generative network. FIG. 5 shows the same arrangement as FIG. 10 but in expanded form.

The encoder 208q comprises one or more statistical models arranged as inference models 108q. The decoder 208p comprises one or more further statistical models 100p arranged as generative models. Each of the inference models 100q may take the form of a neural network (an inference network), and each of the generative models 100p may take the form of a neural network (generative network). By way of preferred example, the following will be described in terms of embodiments where each of the inference and generative models 100q, 100p comprises a respective neural network. However, it is not excluded that in any of the disclosed embodiments, any one, more or all of the inference and/or generative models 100q, 100p could instead be replaced by another form of statistical model suitable for use in machine learning, such as a Gaussian matrix factorization or even linear transformation.

In the example of FIG. 5, the encoder 208q comprises an inference network 100qM taking only the feature vector X as an input and having only the manipulation vector M as an output. The encoder also comprises a separate inference network 100qZ taking a combination of the classification Y, feature vector X and manipulation vector M as an input and arranged to output the latent vector Z. The decoder 208p comprises a separate respective generative network 100pY, 100pZ, 100pM for each of the classification Y, feature vector Z and manipulation vector M respectively. Each takes only a respective one of Y, Z and M as an input. The output of these three generative networks 100pY, 100pZ, 100pM are combined and input to a further separate generative network 100pX, acting as a merging network. The merging network 100pX outputs only the feature vector X.

The neural networks of the encoder 208q and decoder 208p are thus arranged as an auto encoder, in embodiments a variational auto encoder (VAE).

The particular form of the manipulation (e.g. rotation, translation, etc.) is not built into the model 208. Rather, the machine-learning model 208 will learn to infer manipulations based on the causal relationship that is built into the model. Thus the disclosed machine-learning model is robust against manipulations whether or not they were foreseen in the training data.

Manipulations herein may refer to any one or more of a variety of phenomena which affect the observation of the ground truth. For instance, consider the case where the feature vector X comprises elements representing an image. In this case a manipulation may for example comprise a rotation or a lateral translation. It may comprise an unusual light level in which the image was captured, or a certain camera setting used to capture the image such as an unusual exposure time or value. It may comprise a distortion such as optical blurring, quantization noise, image compression or random noise. It may comprise a part of the image of the target object being missing, e.g. due to an obstruction such as a sticker placed over a road sign. In another example, the feature vector X may comprise elements representing audio content. In this case a manipulation may comprise for example a shift in frequency, a quantization, audio compression, audible interference or random noise. As another example, the feature vector X may comprise a representation of natural language content. In this case a manipulation may comprise replacement of one or more words or phrases with synonymous language, or a translation of one or more words or phrases into a different natural language, or a conversion of one or more words or phrases into a different linguistic representation such as a short-hand.

Preferably after at least an initial training period to train the weights ($\phi$, $\theta$), the machine-learning model 208 can then be used by the AI algorithm to predict a value of the classification Y for a given vector value of the input feature vector X. Alternatively or additionally, the weights ($\phi$, $\theta$) of the model 208 can be learned in an ongoing fashion during actual deployment in-the-field.

In embodiments the machine-learning model 208 undergoes learning from two distinct data sets each comprising a plurality of experienced data points. The first set consists of "clean" data that does not include any manipulations. The second set consists of "noisy" data that does include one or more anticipated manipulations (not necessarily random noise, though that it is one possibility). Optionally the known manipulations in the second data set may be labelled and this may improve robustness somewhat further still, but this is not essential. Robustness is still improved even without labelling of the manipulations.

In some cases the first data set may be used to initially train the machine-learning model 208 in an initial training phase. The second data set may be collected and/or learned from during a subsequent testing phase; and/or during an ongoing learning phase when the machine-learning model is actually deployed into a real-life application "in-the field", i.e. actually being for its intended end application. Examples later will be described in terms of the first (clean) data being used in a training phase and the second (noisy/manipulated) data being collected in a subsequent test or deployment phase. However this division is not essential and it will be appreciated that this is not necessarily limiting to any embodiment disclosed herein. Instead, data points from both the first and second data sets could be used to train the machine-learning model 208 in the training phase, and/or both clean and noisy data could be collected and learned from in the test/deployment phase. The data points from the two sets could even be interleaved amongst one another.

Preferably, when learning is conducted based on the first (i.e. clean) data set, M is set to a null value (e.g. all elements 0). Whereas when learning is conducted based on the second (i.e. noisy) data set, then if the manipulation(s) in the data is/are known, M is set to a vector value representing the known manipulation(s). Alternatively if the manipulations is/are not known, M is simply left to be inferred during this phase of the learning.

Further, when learning is conducted based on the first (i.e. clean) data set, some first parts of the overall model 208 are allowed to be learned (i.e. their weights are learned); whilst some other, second parts of the network are fixed (their weights are not learned). The second parts are those that specifically model the causal relationship between M and X. These are networks 100$q$M and 100$p$M in FIG. 5. The first parts are those that do not specifically model the causal relationship with M. These are the networks 100$q$Z, 100$p$Y, 100$p$Z and 100$p$X in FIG. 5. In embodiments, one or more of the first parts are also learned based on the second data set as well as the first. In the example of FIG. 5 these are the networks 100$q$Z, 100$p$X that model a relationship of X with a combination of M and at least of Y and Z. One or more others of the first parts may be fixed when learning based on the second data set. In FIG. 5 these are the networks 100$p$Y, 100$p$Z that model specifically a relationship of X with only Y and/or Z.

This is also illustrated in FIG. 10. Here the first parts which are learned only based on the first (clean) data set (e.g. during training) are shown in the clear box. The second parts, which are learned only based on the second (noisy) data set (e.g. during fine-tuning), are shown in the box patterned with the sparse pattern of dots. The first parts which are learned based on both the first and second data sets (e.g. during both phases) are shown in the box patterned with the dense pattern of dots.

On how the fine-tuning method works, because the model 208 comprises a generative part 208$p$, then one can train the model so that after training it can produce the noisy test input. Remember the generative networks 208$p$ also take Y and M as inputs. This means the algorithm 206 can iterate over all possible Y classes, and use the inference network to infer M. The model is also generative, i.e. one can sample Z, M from random Gaussians, and Y from a uniform distribution, then pass them through p to generate images of X. The way to do fine-tuning is to train the model, so that after fine-tuning, the model is more likely to be able to generate the data used for fine-tuning.

However, the use of the two different data sets, or making a distinction between them during learning, is not essential. This is preferred in order to improve robustness to manipulations including unforeseen manipulations. However, some lesser degree of robustness against robustness can still be achieved without making a distinction between clean and noisy data during training, or even without including any noisy data during training. Even if the manipulation vector M is simply left to be inferred during all training or learning generally, the structure of the machine-learning model 208, which is built around the causal model of FIG. 8, will still provide for some robustness against manipulations by modelling the causal relationship between M and X.

In further variants, the specific structure of the machine learning model can be somewhat different than shown FIG. 5. Some non-limiting examples are shown in FIGS. 6(a)-(c).

Figure 6A:
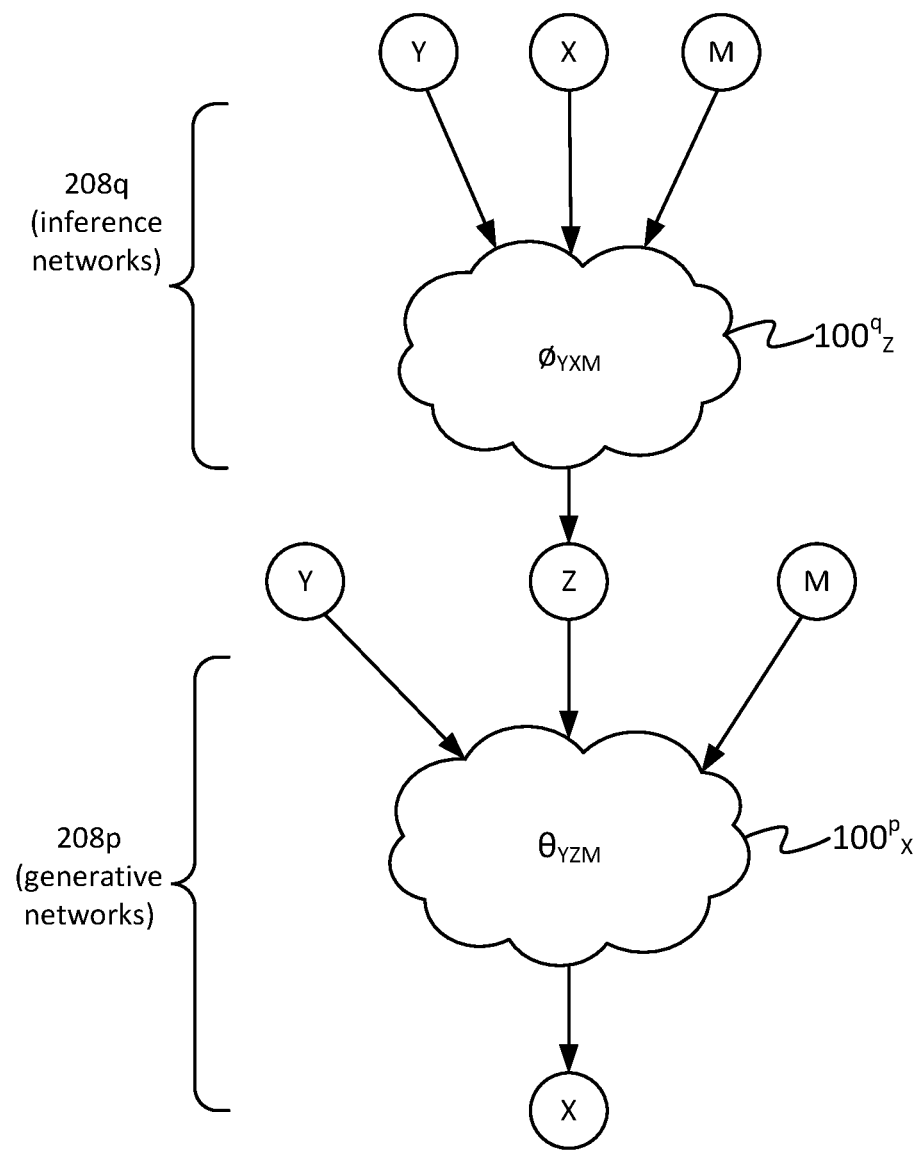
FIGS. 6(a)-(c) schematically illustrate some further example machine-learning models for modelling a causal effect of manipulations on feature values in accordance with embodiments disclosed herein.

In the example embodiment of FIG. 6(a), it is not essential to include in the encoder 208$q$ the network 100$q$M dedicated solely to modelling the relationship between M and X. Instead the encoder 208$q$ may only comprise a single neural network 100$p$Z which encodes the combination of Y, X and M into Z. Alternatively or additionally, it is not essential to include in the decoder 208$p$ the network 100$p$M dedicated to modelling the dependency on M. Instead the decoder 208$p$ may only comprise a single neural network 100$p$X modelling the basic relationship shown in FIG. 8. Or as another variant of this, the decoder 208$p$ may comprise only one or two of the networks 100$p$Y, 100$p$Z, 100$p$M dedicated to Y, Z and M respectively (the other two or one of Y, Z and M being input directly to the merging network 100$p$X).

The embodiments of FIG. 6(a) may not give as good robustness as the example of FIG. 5, but it will still give improved robustness compared to relying on adversarial training alone.

Figure 6B:
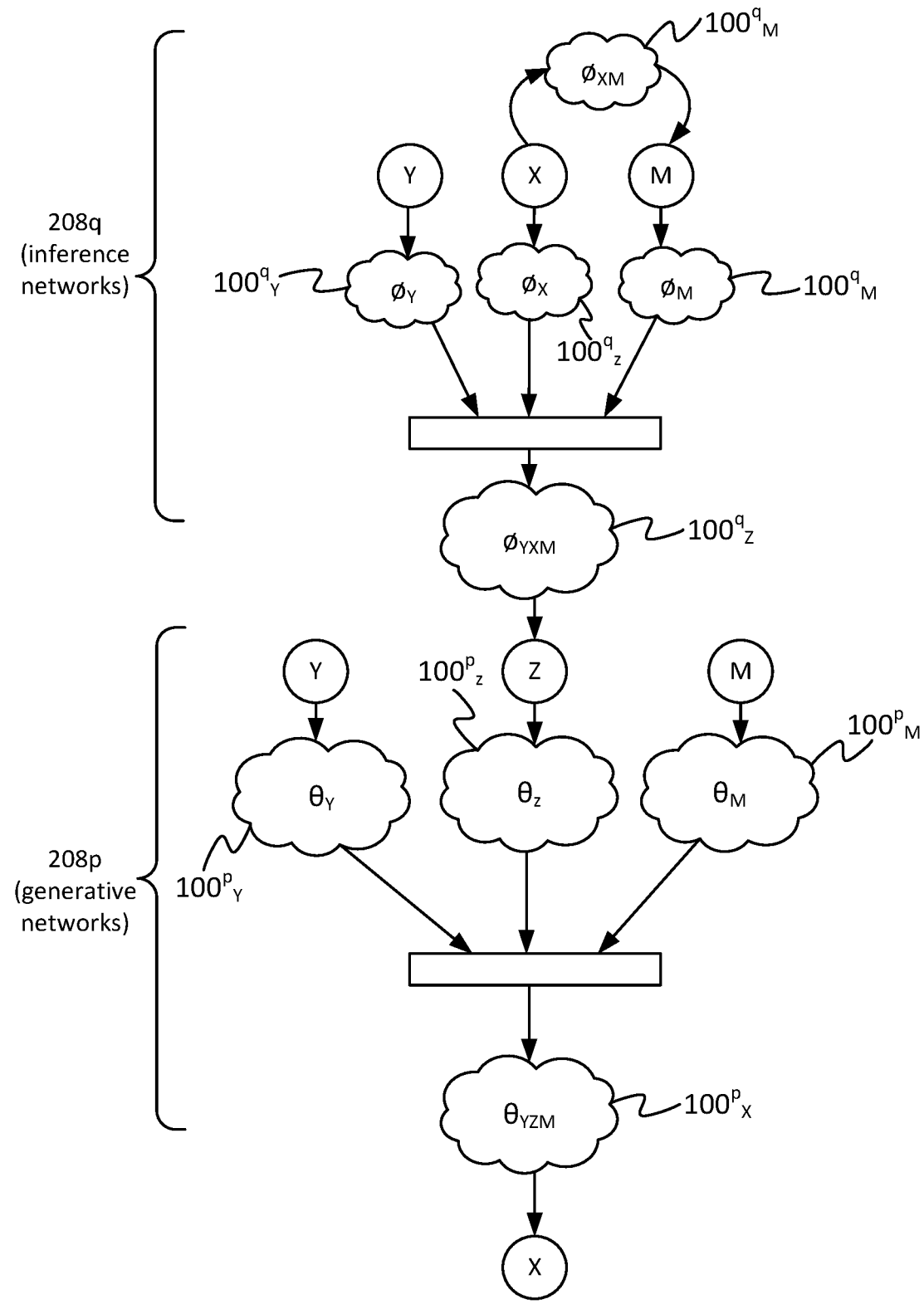
Figure 6C:
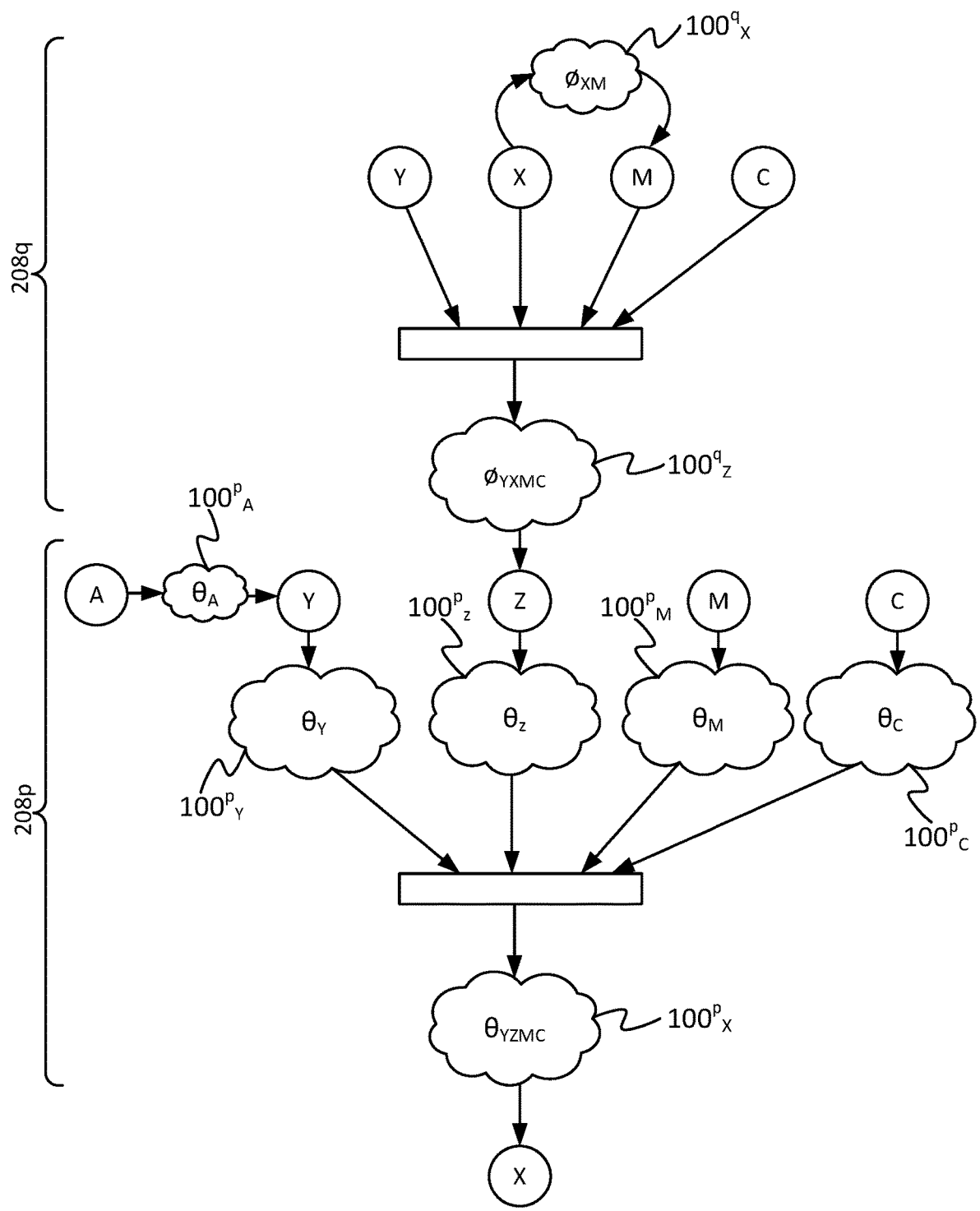

FIG. 6(b) illustrates another embodiment which includes more neural networks than the example of FIG. 5. Here an additional respective neural network is included in each branch between Y, X and M respectively and the neural network 100$q$M that encodes into the latent space Z. Or in variants of this, the extra neural network may only be included in one or two of the branches, for any respective one or two of Y, X and M.

The example of FIG. 6(b) may give better robustness even than the example of FIG. 5, but at the cost of increased complexity. The additions of FIG. 6(b) are not essential In further variants of any of the above-described embodiments, the machine-learning model need not take the form of an auto encoder. Instead, either the top half (inference networks 208$a$) or bottom half (generative networks 208$p$) may be removed.

Figure 12:
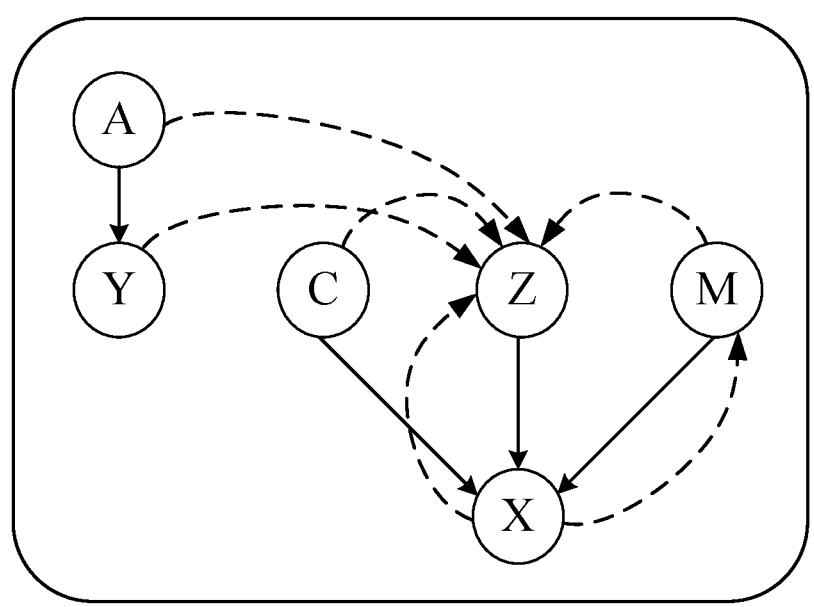
FIG. 12 is a graphical representation of an example deep generative model for generic measurement model data in accordance with embodiments disclosed herein

Yet another embodiments is shown in FIG. 6(c). A high-level representation of this is also shown in FIG. 12. Here, one or both of two additional vectors are incorporated into the machine-learning model 208, each modelling a potential additional causal factor. The first may be referred to herein as a co-parent vector, modelling a possible circumstance which may produce similar results to the ground truth represented by the classification Y. The second vector is a parent vector A modelling a cause of the ground truth. For instance, if the machine-learning model 208 is to test for the presence of a particular condition such as a disease in a subject (e.g. patient), then Y is the classification of whether the subject has that condition. If X is a vector of symptoms, then C could represent a vector of potential other conditions producing similar symptoms to the target condition expressed by Y. The parent vector A could be a vector of possible causes of the disease, such as whether the subject is a smoker, whether they are overweight, or a certain genetic background, etc. For example smoking (A) might be a cause for having lung cancer or not (Y).

In an example implementation of such embodiments, the inference network 100$q$Z in the encoder 208$q$ may additionally take C as an input (thus encoding a combination of Y, X, M and C into X). Alternatively or additionally, the decoder 208p may comprise a further respective generative network 100pC taking C as an input, and having an output forming another of the inputs to the merging network 100pX. To accommodate the relationship between A and Y, the decoder 208p may further comprise another generative neural network mapping from A to Y.

The example of FIG. 6(c) may give better robustness even than the example of FIG. 5, but again at the cost of increased complexity. The additions of FIG. 6(c) are not essential.

It will be appreciated that any combination of the variants from FIGS. 6(a)-(c) may also be employed.

Some further rational behind the disclosed techniques, as well as some example implementations and results, are now discussed in more detail.

Figure 7A:
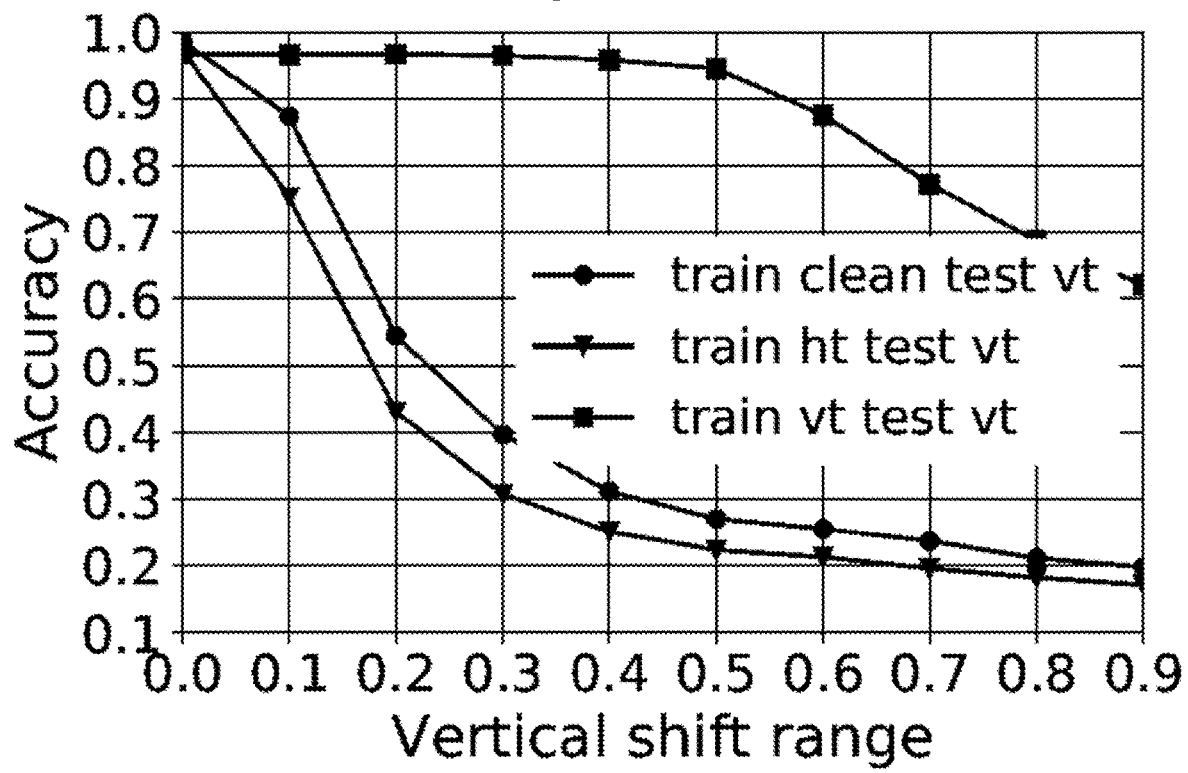
FIGS. 7(a)-(b) show plots of robustness results for deep neural networks (DNNs) against different manipulations of handwritten digits from the Modified National Institute of Standards and Technology (MNIST) database.
Figure 7B:
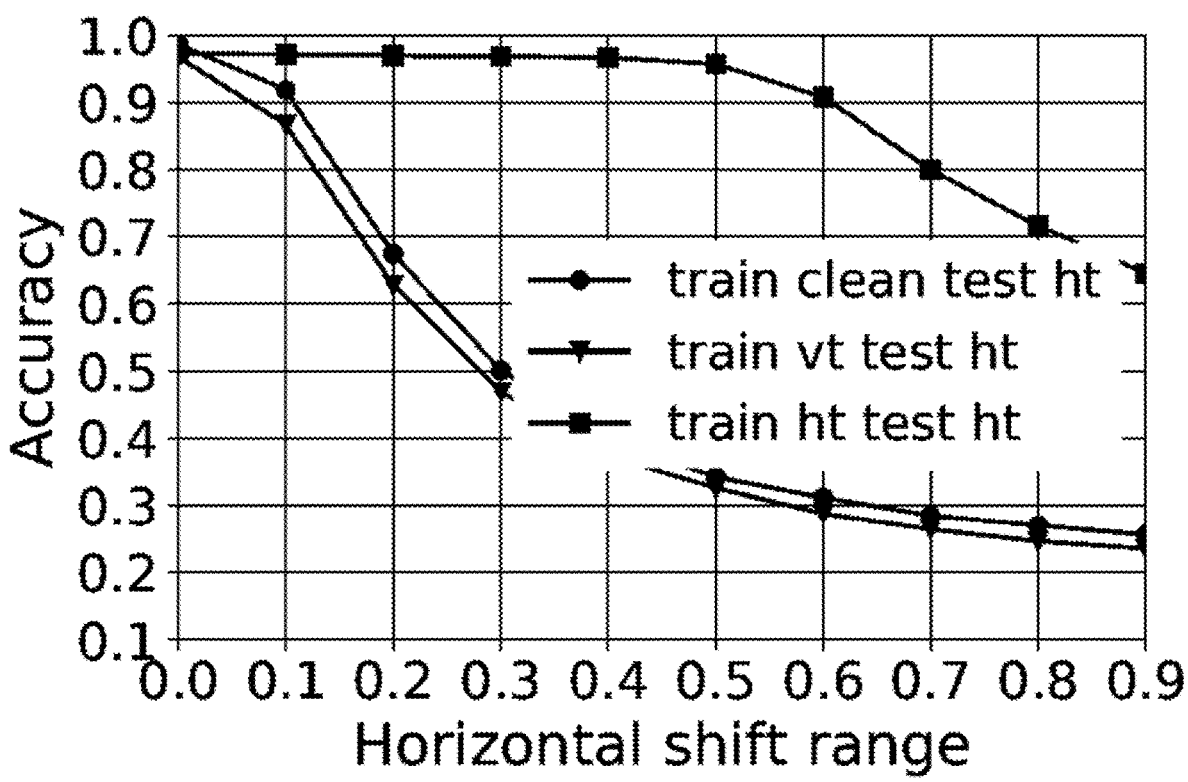

FIG. 7 shows robustness results for a conventional DNN against different manipulations on MNIST. Panels (a) and (b) show the accuracy on classifying noisy test data generated by shifting the digits vertically (vt) and horizontally (ht). It shows that data augmentation during training makes generalization to unseen shifts worse. See the lower two lines labelled "train ht test vt" and "train vt test ht" (meaning train based on horizontally translated data and then test based on vertically translated data, and vice versa).

Deep neural networks (DNNs) have great success in many real-life applications. However, they are easily fooled even by a tiny amount of perturbation. Lack of robustness hinders the application of DNNs to critical decision making tasks such as uses in health care. To address this, a deep learning practitioner may suggest training DNNs with datasets that are not only big but also diverse. Indeed, data augmentation and adversarial training have shown improvements in both the generalization and robustness of DNNs. Unfortunately, this does not address the vulnerability of DNNs for unseen manipulations. For example see FIG. 7.

FIG. 7 shows robustness results for a conventional discriminative DNN against different manipulations on MNIST. Panels (a) and (b) show the accuracy on classifying noisy test data generated by shifting the digits vertically (vt) and horizontally (ht). It shows that data augmentation during training makes generalization to unseen shifts worse. See the lower two lines labelled "train ht test vt" and "train vt test ht" (meaning train based on horizontally translated data and then test based on vertically translated data, and vice versa).

As shown in FIG. 7, a DNN trained on clean MNIST digits fails to classify shifted digits. Although observing (adversarial) perturbations of clean data in training improves robustness against that particular manipulation (see the top line with square points), the DNN is still fragile when unseen manipulations are present (e.g. see the bottom line with triangular points). Since it is unrealistic to augment the training data towards all possible manipulations that many occur, a principled method that fundamentally improves the robustness is much needed.

On the other hand, humans naturally understand the independent causal mechanisms for visual recognition tasks. For example, after learning the concept of an "elephant", a child can identify the elephant in a photo taken under any lightning condition, location, etc. Importantly, the elephant, the lightning condition, and the location are causes of the presented view in the photo. Therefore we argue that the incapability for causal reasoning is the reason for DNN's vulnerability to (adversarial) data manipulations.

This work discusses the robustness of DNNs from a causal perspective. The disclosed contributions include the following:

A causal view on robustness of neural networks. We argue from a causal perspective that adversarial examples for a model can be generated by manipulations on the effect variables and/or their unseen causes. Therefore DNN's vulnerability to adversarial attacks is due to the lack of causal understanding.

A causally inspired deep generative model. We design a causal deep generative model which takes into account the unseen manipulations of the effect variables. Accompanied with this model is a test-time inference method to learn unseen manipulations and thus improve classification accuracy on noisy inputs. Data augmentation techniques can also be safely applied to our model during training without deteriorating its generalization ability to unseen manipulations. Compared to DNNs, experiments on both MNIST and a measurement-based dataset show that our model is significantly more robustness to unseen manipulations.

A CAUSAL VIEW ON ROBUSTNESS OF NEURAL NETWORKS

Discriminative DNNs are not robust to manipulations such as adversarial noise injection, rotation and shift. They do not understand the causal mechanisms of the data generating process, which leads to overfitting to nuisance factors that are less related to the ground truth classification results. By exploiting the overfit to the nuisance factors, an adversary can easily manipulate the inputs to fool discriminative DNNs into predicting the wrong outcomes.

On the contrary, we as human can easily recognize an object in a scene and be indifferent to the changes in other aspects such as background, viewing angle, the presence of a sticker to the object, etc. More importantly, our recognition is not affected even when some of the perturbations, e.g. the lighting condition, are significant. We argue that the main difference here is due to our ability to perform causal reasoning, which identifies independent mechanisms that are not causally related to the object recognition results. Therefore our visual recognition is much more robust to not only one adversarial example of a certain type, but also to many types of manipulations. Thus we argue that one should incorporate causal mechanisms into model design, and make the machine learning model robust on the level of different types of perturbations.

Before we proceed to propose our causally informed model, we first define a valid manipulation of inputs in a causal sense. A valid manipulation is a perturbation on data, which only changes the effects, not the cause of the target. We visualize a causal graph in FIG. 8, where the edge indicates the cause-effect relationship between variables. Take hand-written digit classification for example, X is the image of a digit and Y is the class label. The appearance of X is an effect of the digit number Y, latent causes, such as style, and possible manipulations M, such as rotation or translation. Changes to Z and M cause the appearance of X to change, but X still carries the same information about Y regardless of Z and M. This is because Z, M and Y are independent mechanisms. Thus, any manipulation that does influence the relationship from Y to X are valid manipulations. Humans are extremely robust to these manipulations while machine learning algorithms are vulnerable.

In summary, from the causal perspective, any manipulation M on data X, that is a co-parent of Y, is a valid manipulation. This definition includes all manipulations used in existing work on the robustness of neural networks. For example, in image and speech data, one of the most commonly used manipulations is perturbation within a small distance defined by the Lp norm. This means the manipulation M is to add a small amount of noise. In the ideal case, the machine learning method should be able to generalize to any valid manipulation. Using manipulated data examples in training should never harm the robustness to unseen manipulations. However, current deep learning models ignore the causal structure and only map X to Y. Thus, they are vulnerable. Inspired by causal reasoning of humans, we provide a deep learning framework concerning the causal relationship.

FIG. 8 shows an example of a causal model where X is the effect of Y, Z and M.

FIG. 9 gives a graphical presentation of proposed causally consistent deep generative model for single modal data.

FIG. 10 shows an example network architecture in accordance with embodiments disclosed herein. Shaded areas show the selective part for "do(m)" training and the fine-tune method, respectively.

THE CAUSAL MANIPULATION AUGMENTED MODEL

We provide a deep Causal Manipulation Augmented model (deep CAMA), which takes into account the causal relationship for model design. Our proposed model is more robust to unseen manipulations on effect variables, and more importantly, our model can learn these manipulations without supervision. The robustness can be further improved by training-time data augmentation, without sacrificing the generalization ability to unseen manipulations. Below we first present the deep CAMA for single modality data, which focuses on predicting Y using X, and then present a generic deep CAMA for multimodality measurement data.

DEEP CAMA FOR SINGLE MODALITY DATA

The task of predicting Y from X covers a wide range of applications such as image or speech recognition and sentiment analysis. Normally a discriminative DNN takes X as input and directly predicts (the distribution of) the target variable Y. Generative classifiers, on the other hand, build a generative model Y→X, and use Bayes' rule for predicting Y given X: $p(y|x) = p(y)p(x|y)/p(x)$.

We design deep CAMA, shown in FIG. 9, following the causal relationship as shown in FIG. 8. Taking MNIST for example: Y is the label and X is the image, Z models the latent style of the digits, and M handles the manipulations that we desire the model to be robust to. The model is defined as:

$$p_\theta(x, y, z, m) = p(m)p(z)p(y)p_\theta(x|y, z, m) \quad (1)$$

For efficient inference we follow the amortized inference approach in variational auto-encoders and define an inference network as the approximate posterior distribution:

$$q_\phi(z, m|x, y) = q_{\phi_1}(z|x, y, m) q_{\phi_2}(m|x) \quad (2)$$

Note that we assume the dependence of M on X only in $q_\phi(m|x)$, which, as we shall show later, allows deep CAMA to learn unseen manipulations with unlabelled noisy data.

An example network architecture is presented in FIG. 10. For the p model, the cause variables Y, Z and M are first transformed into feature vectors hY, hZ and hM. Later, these features are merged together and then passed through another neural network to produce the distributional parameters of $p_\theta(x|y, z, m)$. For the approximate posterior q, two different networks are used to compute the distributional parameters of $q_\phi(m|x)$ and $q_\phi(z|x, y, m)$, respectively.

Model training: assume that during training, the model observes clean data D={(xn, yn)} only. In this case we set the manipulation variable M to a null value, e.g. do(m=0), and train deep CAMA by maximizing the likelihood function log p(x, y, do(m=0)) under training data. Since this marginal distribution is intractable, we instead maximize the intervention evidence lower-bound (ELBO) with do(m=0), i.e. $\max\theta, \phi \mathbb{E}_D[\text{ELBO}(x, y, do(m=0))]$, with the ELBO defined as:

$$\text{ELBO}(x, y, do(m) = 0) := \mathbb{E}_{q_\phi(z, do(m)=0|x, y)} \left[ \log \frac{p_\theta(x, y, z, do(m) = 0)}{q_\phi(z, do(m) = 0|x, y)} \right] \quad (3)$$

$$= \mathbb{E}_{q_{\phi_1}(z|x, y, m=0)} \left[ \log \frac{p_\theta(x|y, z, m = 0)p(y)p(z)}{q_{\phi_1}(z|x, y, m = 0)} \right]$$

If noisy data D' is available during training, then similar to data augmentation and adversarial training, we can augment the training data with this noisy data. We still use the intervention ELBO (3) for clean data. For the manipulated instances, we can either use the intervention ELBO with do(m=m0) when the noisy data D'={(m0(x), y)} is generated by a known manipulation m0, or, as done in our experiments, infer the latent variable M for unknown manipulations. This is achieved by maximizing the ELBO on the joint distribution log p(x, y) using noisy data:

$$\text{ELBO}(x, y) := \mathbb{E}_{q_\phi(z, m|x, y)} \left[ \log \frac{p_\theta(x, y, z, m)}{q_\phi(z, m|x, y)} \right] \quad (4)$$

and therefore the total loss function to be maximized is defined as:

$$\mathcal{L}_{aug}(\theta, \phi) = \lambda \mathbb{E}_D[\text{ELBO}(x, y, do(m=0))] +$$
$$(1-\lambda) \mathbb{E}_D[\text{ELBO}(x, y)]. \quad (5)$$

Our causally consistent model effectively disentangles the latent representation: Z models the unknown causes in the clean data, such as personal writing style; and M models possible manipulations 115 which the model should be robust to, such as shift, rotation, noise etc. Due to independent mechanism assumptions in causality, the influence of Y, Z and M on X can be independently applied. Thus, with our model design, we can also ensure that the dependencies Y→X and Z→X are not affected by noisy data present during training. As a result, deep CAMA's can still generalize to unseen manipulations even after seeing lots of noisy data points from other manipulations, in contrast to the behaviour of discriminative DNNs as shown in FIG. 7.

Prediction: we assume the test data $\tilde{D}$ are generally not clean, and we would like our model to be robust to the unseen manipulated test data. Thus, at test-time, M is unknown, and deep CAMA classifies an unseen test data x*, using a Monte Carlo approximation to Bayes' rule with samples mu~qø2(m|x), zck~qø(z|x*, yc, mu):

$$p(y^*|x^*) = \frac{p(x^*|y^*)p(y^*)}{p(x^*)} \approx softmax_{c=1}^C \left[ \log \sum_{k=1}^K \frac{p_\theta(x|y, z_c^k, m^u)p(y_c)p(z)}{q_{\phi_2}(z_c^k|x^*, y_c, m^u)} \right]. \quad (6)$$

In addition, deep CAMA can be adapted to the unseen manipulations present at test time without labels on the noisy data. This is achieved by learning the independent mechanism M→X, but keeping the mechanisms Y→X and Z→X fixed. As shown in FIG. 10, for the generative model, we only fine-tune the networks that are dependent on M, i.e. NNpM and NNpmerge, by maximizing the ELBO of the marginal distribution log p(x):

$$ELBO(x) := \frac{1}{C}\sum_{c=1}^{C} ELBO(x, y_c) + \log C. \quad (7)$$

To reduce the possibly negative effect of fine-tuning to model generalization, we use a one-layer network for NNpmerge and deep networks for NNpM, NNpY and NNpZ. We fine-tune all the networks for the approximate posterior q as M is also involved in the inference of Z. In sum, in fine-tuning the selective part of the deep CAMA model is trained to maximize the following objective:

$$\mathcal{L}_{ft}(\theta, \phi) = \alpha \mathbb{E}_{\mathcal{D}}[ELBO(x, y)] + (1-\alpha)\mathbb{E}_{\mathcal{D}}[ELBO(x)]. \quad (8)$$

One can also use the intervention ELBO for the clean training data.

Notice that there may exist infinitely many manipulations and it is impossible to observe all of them at training time. Therefore by fine-tuning at test-time, the model can be adapted to any unseen manipulation which is desirable in many real-life applications. As shown in our experiments, the proposed deep CAMA model and the training methods are capable of improving the robustness of the generative classifier to unseen manipulations.

DEEP CAMA FOR GENERIC MEASUREMENT DATA

Figure 11:
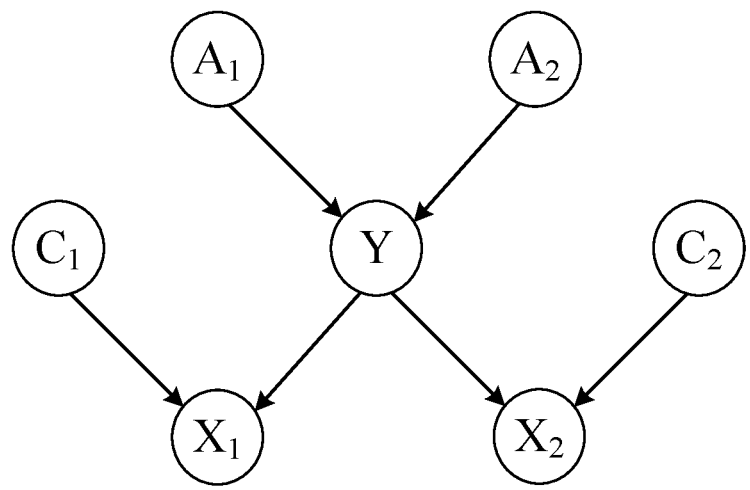
FIG. 11 illustrates an example of the Markov Blanket of target variable Y.

We now discuss an even more general version of deep CAMA to handle multimodality in measurement data. To predict the target variable Y in a directed acyclic graph, only variables in the Markov blanket of Y (shown in FIG. 11) are required. This includes the parents (A), children (X), and co-parents (C) of the target Y. Similar to the single modal case above, here a valid manipulation can only be independent mechanisms applied to X or C to ensure that Y does not change and the relationship from Y to X does not change.

FIG. 6 gives a graphical presentation of proposed causal deep generative model for generic measurement modal data.

Following the causal process, we design the generic deep CAMA according to the causal process, shown in FIG. 6. Unlike discriminative DNNs where A, C and X are used together to predict Y directly, we consider the full causal process and treat them separately. Building on the deep CAMA for single modality data, we add the extra consideration of the parent and observed co-parent of Y, while modelling the latent unobserved cause in Z and potential manipulations in M. We do not need to model manipulation on C as they are out of the Markov Blanket of Y. Thus, our model is defined as:

$$p_\theta(x,y,m,a,c) = p(a)p(m)p(z)p(c)p_{\theta_1}(y|a)p_{\theta_2}(x|y,c,z,m), \quad (9)$$

and we define the approximate inference network as:

$$q_\phi(z,m|x,y,a,c) = q_{\phi_1}(z|x,y,m,a,c)q_{\phi_2}(m|x). \quad (10)$$

Training, fine-tuning and prediction proceed in the same way as in the single modality deep CAMA (see previous section) with do(m) operations and Monte Carlo approximations. As we only fine-tune the networks that are dependent on M, using similar reasoning one can show that the multimodality deep CAMA is robust to manipulations directly on the effect variable X.

Our proposed model is also robust to manipulations on the co-parents C by design. By our definition of valid manipulation, perturbing C only causes the changes in X, thus it is a valid manipulation. If the underlying causal relationship between C and X remains the same, and the trained model accurately learns p(x|y, c), our model is very robust to such changes. This is because we use Bayes' rule for prediction, $$p(y|a, x, c) = \frac{p(y|a)p(a)p(c)p(x|y, c)}{p(a)p(c)\int_u p(y|a)p(x|y, c)} = \frac{p(y|a)p(x|y, c)}{\int_u p(y|a)p(x|y, c)}. \quad (11)$$

We see that the manipulations on C (thus changing X) do not affect the conditional distribution component p(x|y, c) in the generative classifier (Eq. 11). In contrast, discriminative DNNs concatenate X, C, A together and map these variables to Y, therefore they are sensitive to manipulations on C and/or X.

EXPERIMENTS

In this section, we first show the robustness of our proposed deep CAMA on an image classification task. Then, we demonstrate the behaviour of our generic deep CAMA for measurement data. More results with different DNN architectures and different manipulations are shown in the appendix.

ROBUSTNESS TEST ON MNIST

We first demonstrate the robustness of our model against vertical (VT) and horizontal (HT) shifts (i.e. lateral translation). Details such as network width and depth are presented in the appendix. We have also run the experiments 5 times. For MNIST, the results are very stable and the variances are not visible in the plot, we thus plot the result from one run.

In FIG. 13, the first row shows the results of testing the model robustness against horizontal shifts and the second row shows the results against vertical shifts. These results do not use do(m) for the training data during the finetune test time. The results with do(m) for the training data are similar and are shown in the Appendix.

Figure 13A:
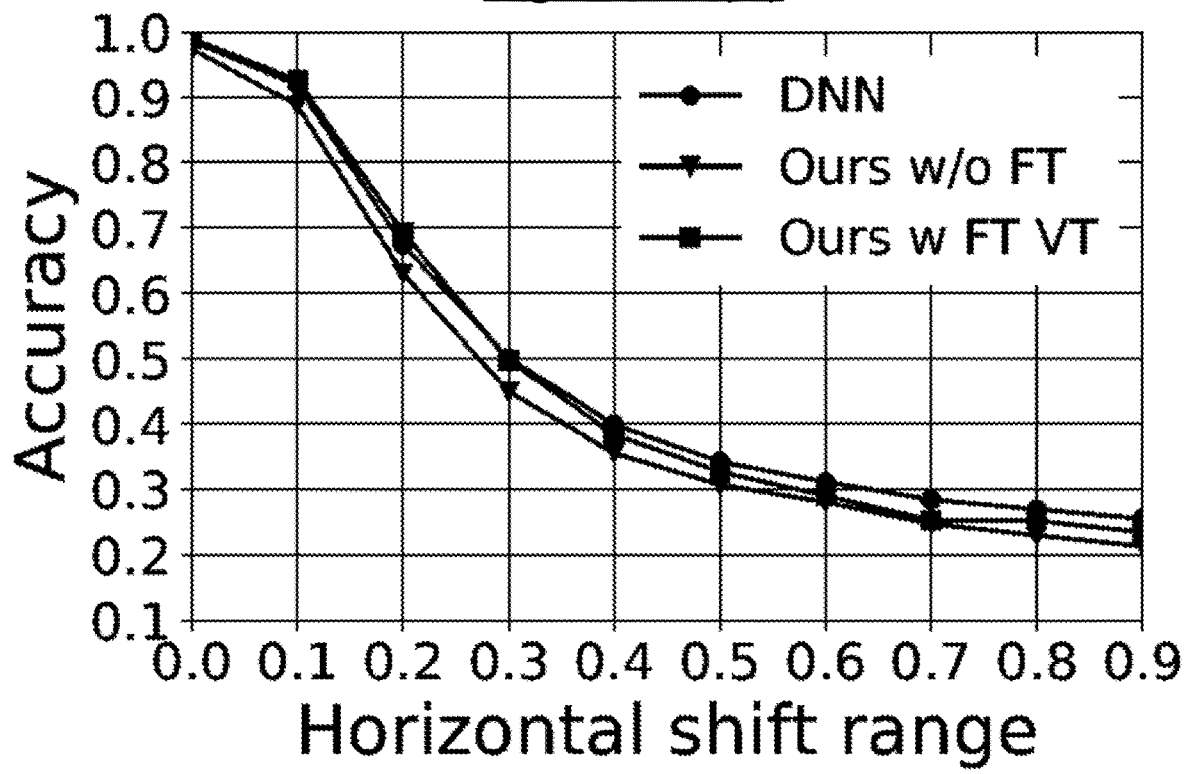
FIGS. 13(a)-(f) are plots of results of testing the robustness against horizontal shifts when using a model based on the techniques disclosed herein.
Figure 13B:
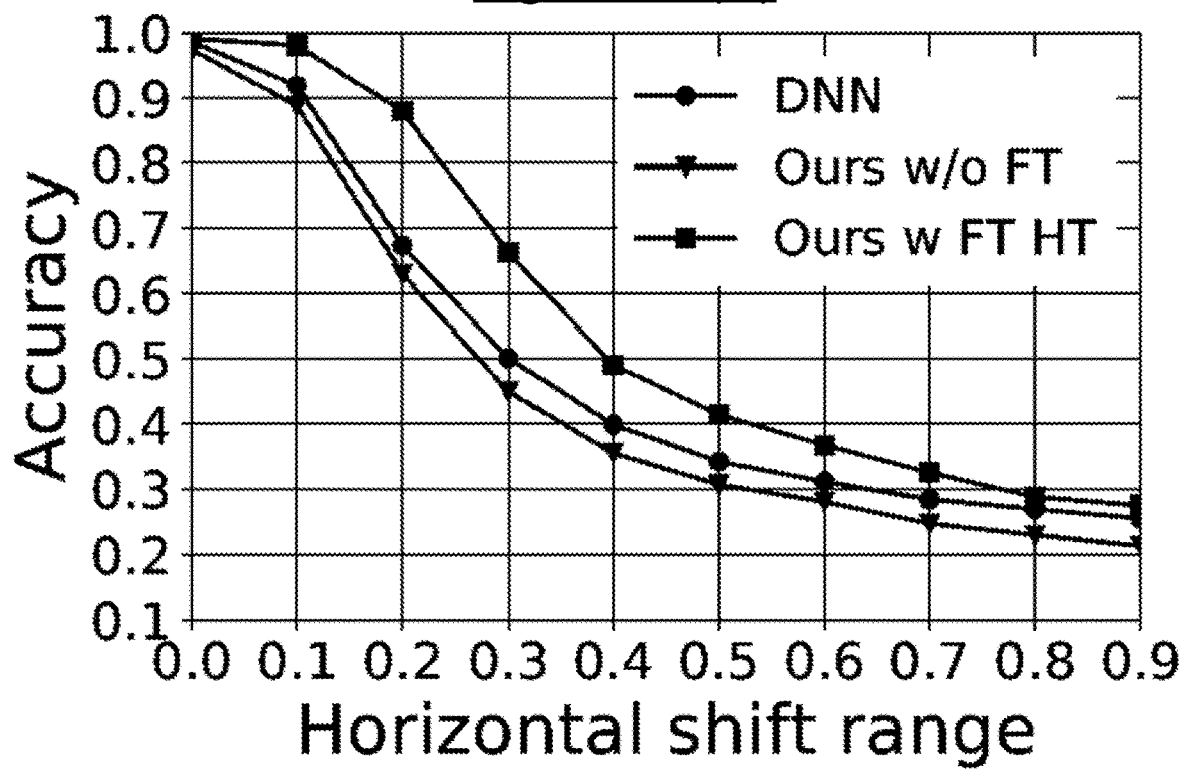
Figure 13C:
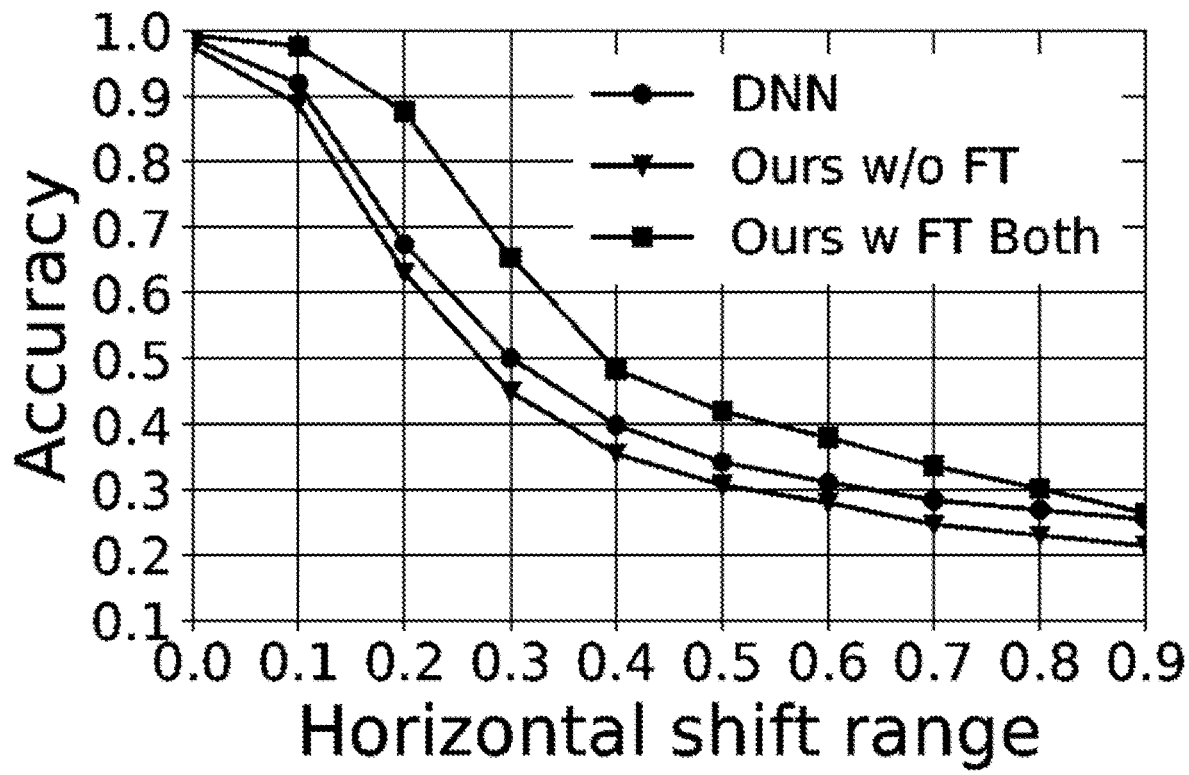
Figure 13D:
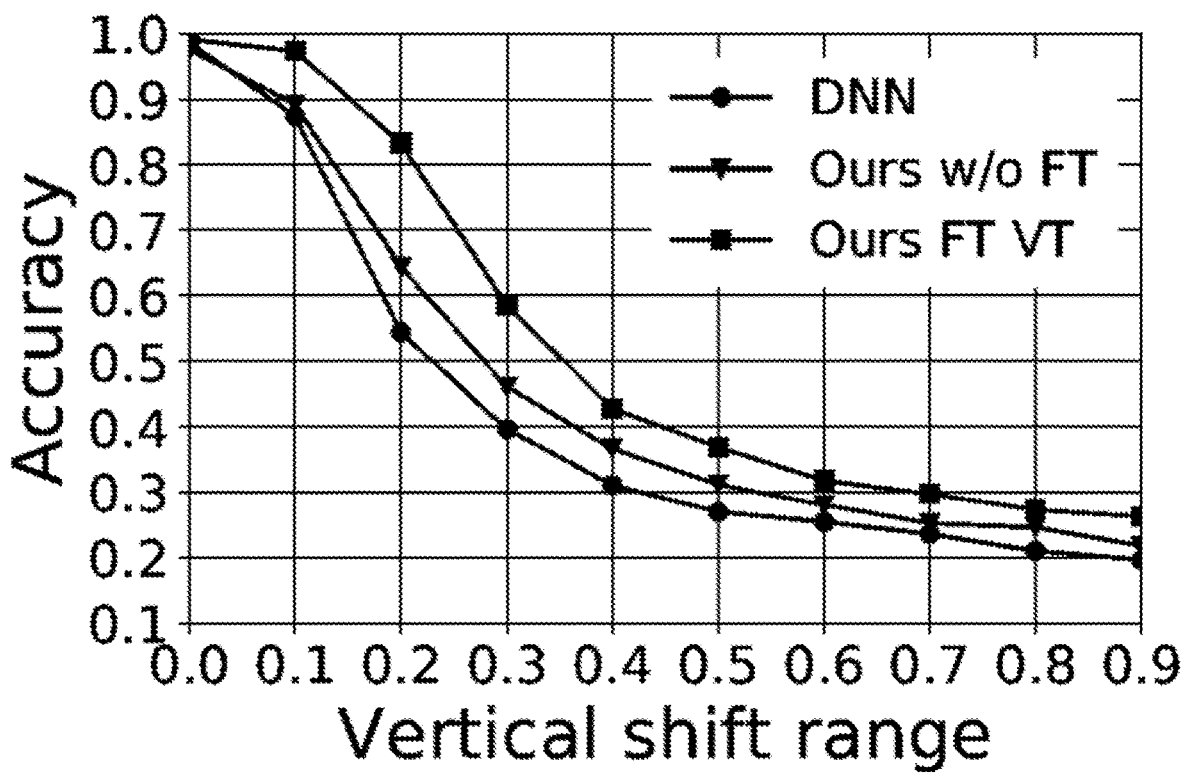
Figure 13E:
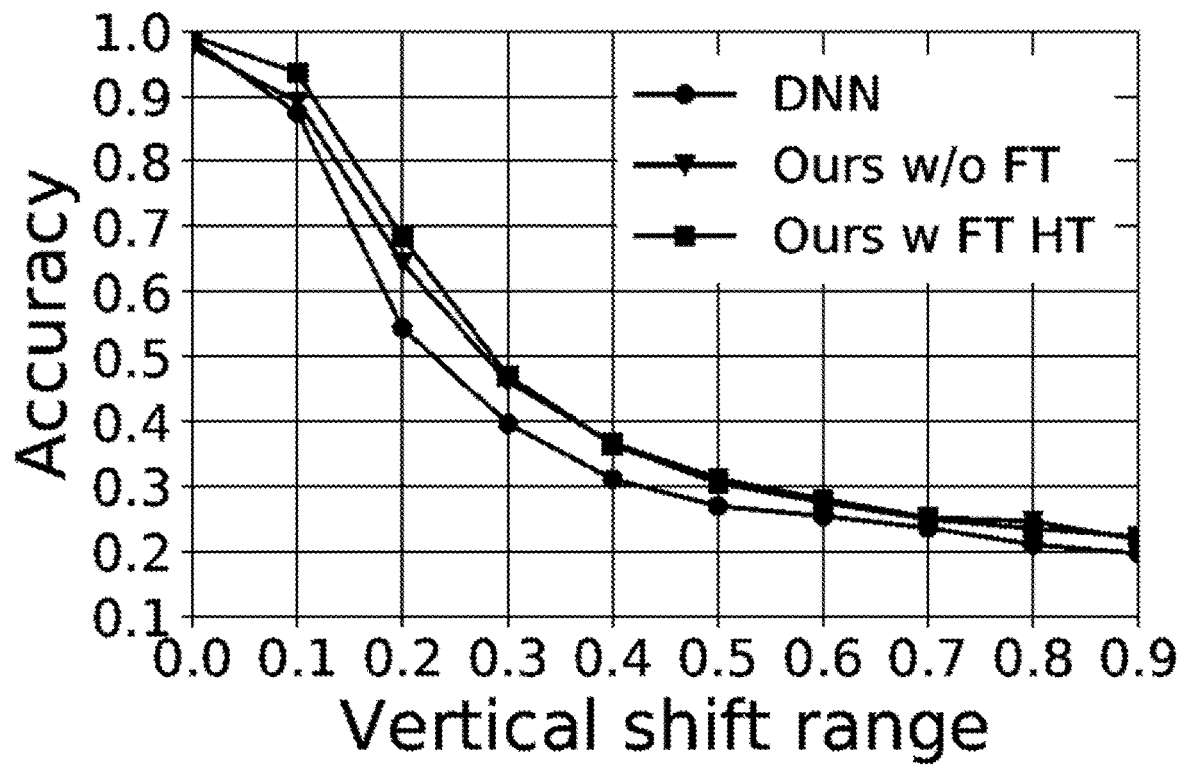
Figure 13F:
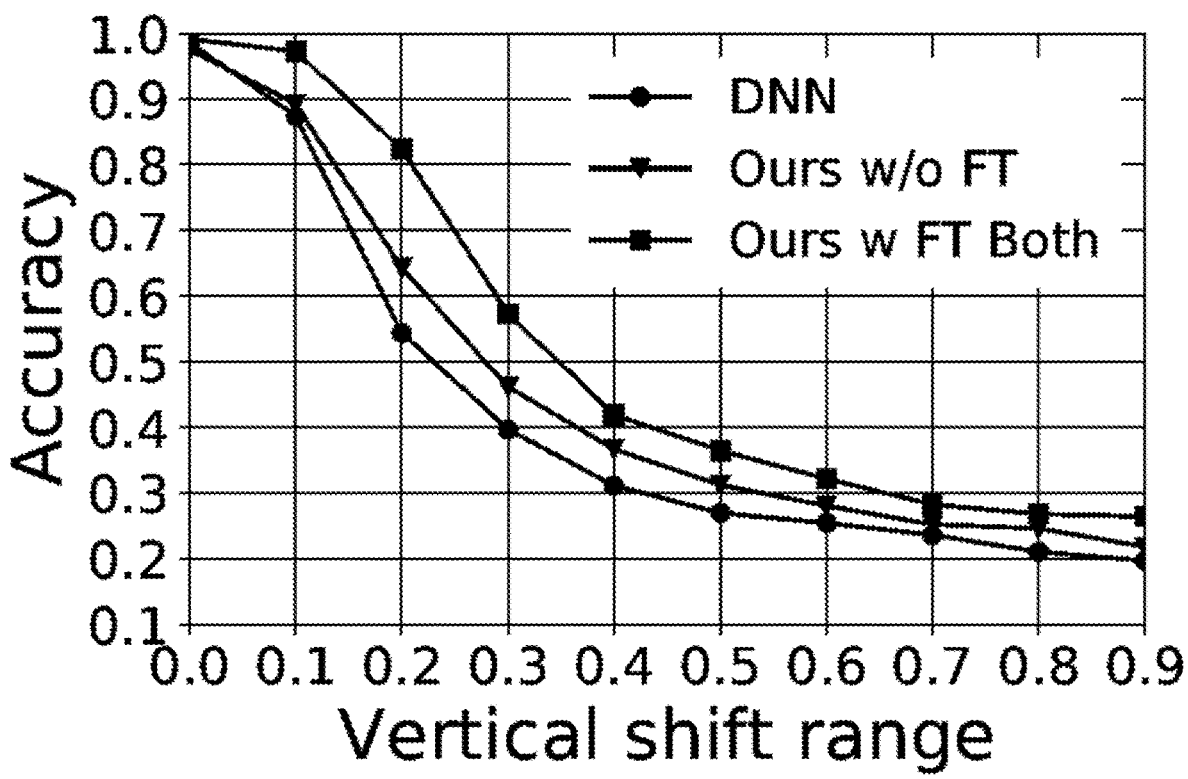

FIG. 13(a) shows the results for fine tuning (FT) with vertical translation (VT) and testing with horizontal translation (HT). FIG. 13(b) shows the results for fine tuning based on VT and testing with HT. FIG. 13(c) shows the results for fine tuning with both HT and VT, and testing with HT. FIG. 13(d) shows results for fine tuning with VT and testing with VT. FIG. 13(e) shows results for fine tuning with HT and testing with VT. FIG. 13(f) shows results for fine tuning with both HT and VT, and testing with VT.

Training with clean data only: FIG. 13 shows the robustness results for deep CAMA trained using only clean data. Deep CAMA without fine-tuning (lines with triangular points lines) perform similarly to a DNN (lines with circular points) on horizontally shifted images, but it is more robust to vertical shifts. The advantage of deep CAMA is clear when fine-tuning is used at test time (lines with square points): fine-tuning on noisy test data with the same shift clearly improves the robustness of the network (panels 13(b) and 13(d)). We further inspect the generalization of deep CAMA to unseen manipulation after fine-tuning in panels 13(a) and 13(e). We see that the robustness results of fine-tuned models are similar or even slightly better than the models without fine-tuning. This clearly shows that our model is capable of learning manipulations in an unsupervised manner, without deteriorating the generalization ability to unseen manipulations. Lastly, panels 13(c) and 13(f) show the robustness of our model to both shifts when both types of manipulation are used for fine-tuning, and we see clear improvements over both manipulations.

Figure 14:
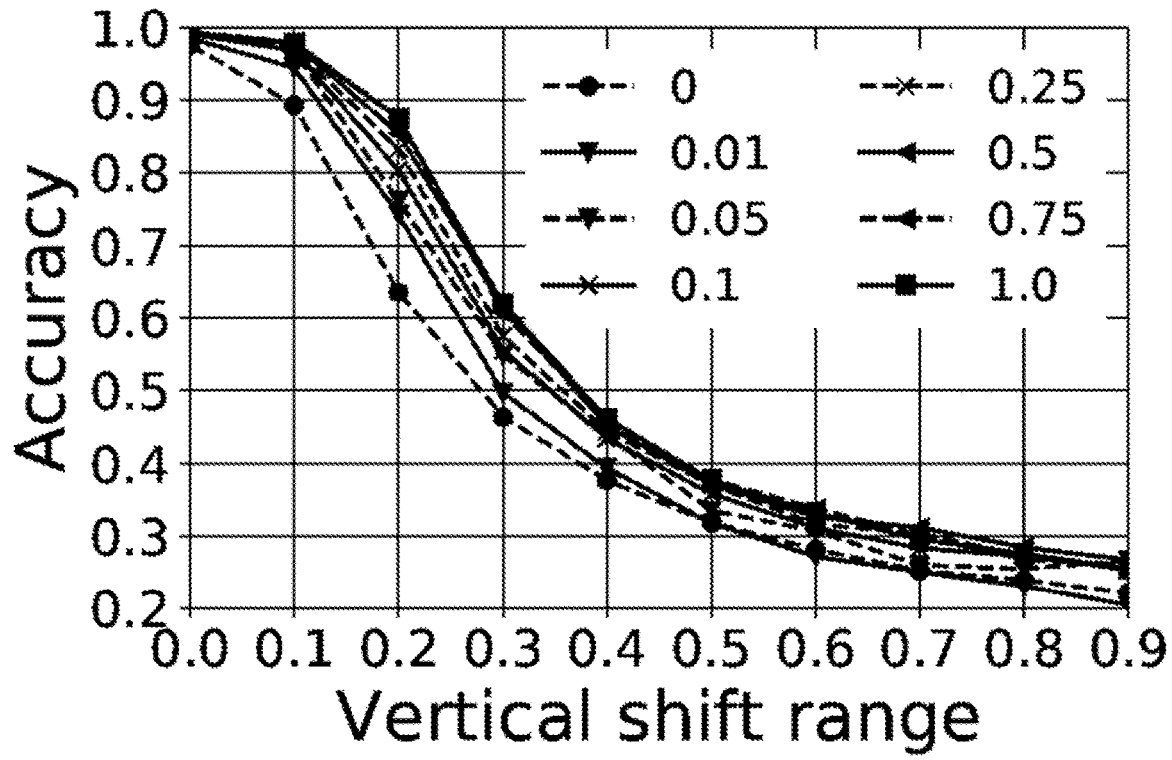
FIG. 14 is a plot of performance data for different percentages of test data used for fine-tuning.

We also quantify the amount of noisy data required for fine-tuning in order to improve the robustness of deep CAMA models (in the above test 50% of noisy test data are used for fine-tuning). As shown in FIG. 14, even using 1% of the noisy data is sufficient to learn the vertical shift manipulation presented in the test set.

FIG. 14 shows the performance for different percentages of test data used for fine-tuning manipulation.

Figure 15A:
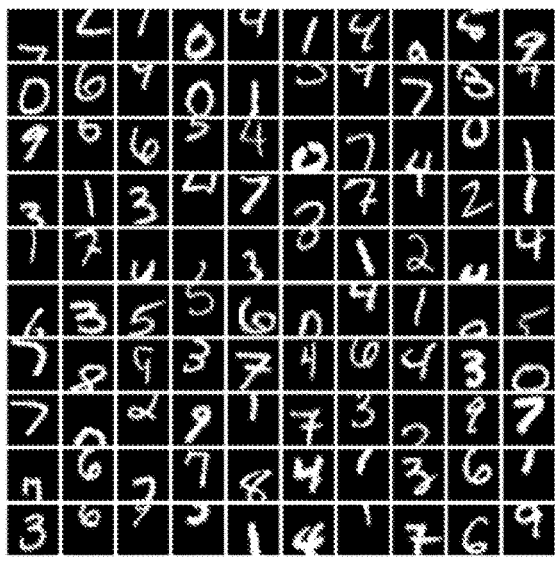
FIGS. 15(a)-(b) shows an example of vertically shifted training data.
Figure 15B:
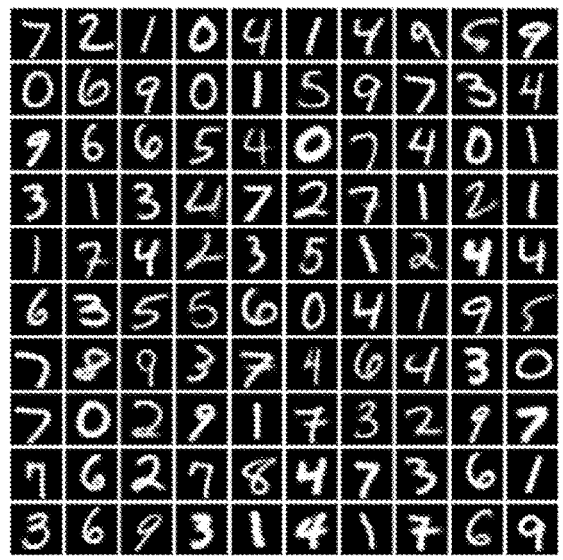

Training with augmented data: We explore the setting where the training data is augmented with noisy data. FIG. 15(a) shows vertically shifted training data. FIG. 15(b) shows the case of do(m=0) with the z and y from the vertical shifted data. As discussed previously, in this case deep CAMA naturally learns disentangled representation due to its independent mechanism design. Indeed this is confirmed by FIG. 15, where panel 15(b) shows the reconstructions of noisy data from panel 15(a) with do(m=0). In this case the model keeps the identity of the digits but moves them to the centre of the image. Recall that do(m=0) corresponds to clean data which contains centred digits. This shows that deep CAMA can disentangle the intrinsic unknown style Z and the shifting manipulation variable M.

Figure 16A:
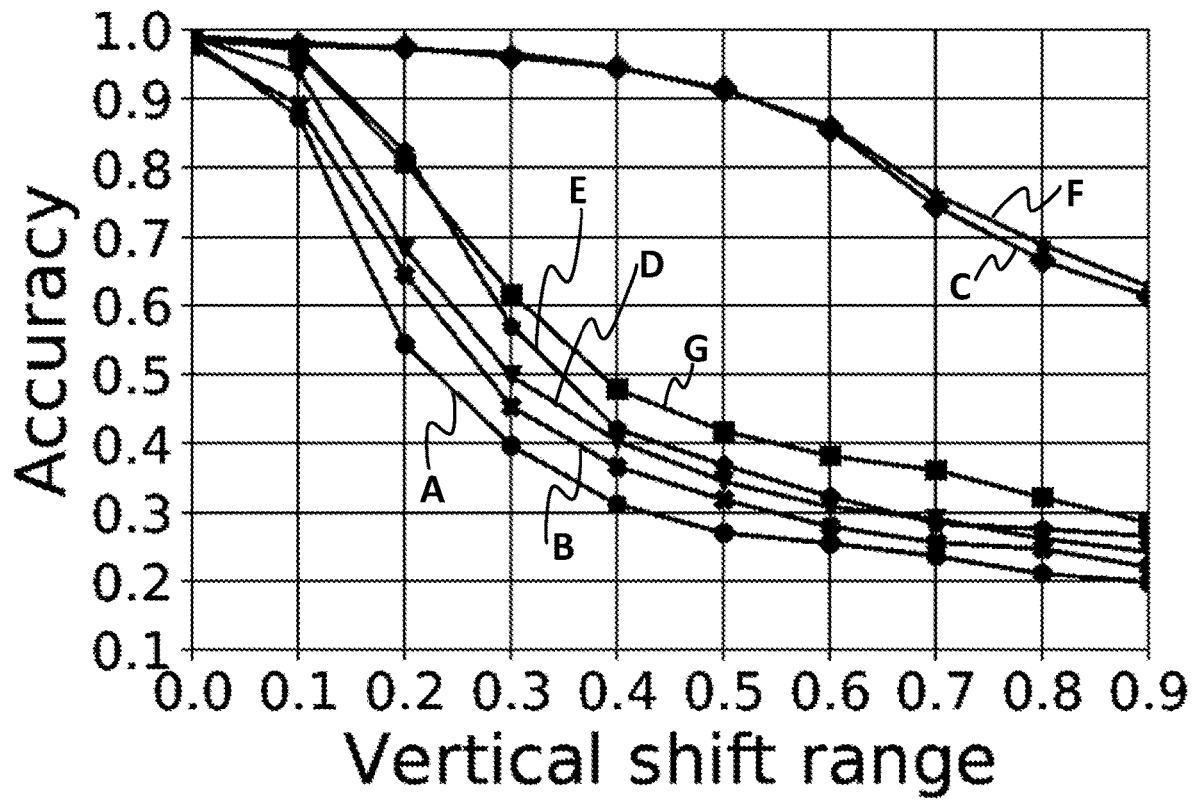
FIG. 16(a) is a plot showing performance in a test with a manipulation in the form of a vertical shift.
Figure 16B:
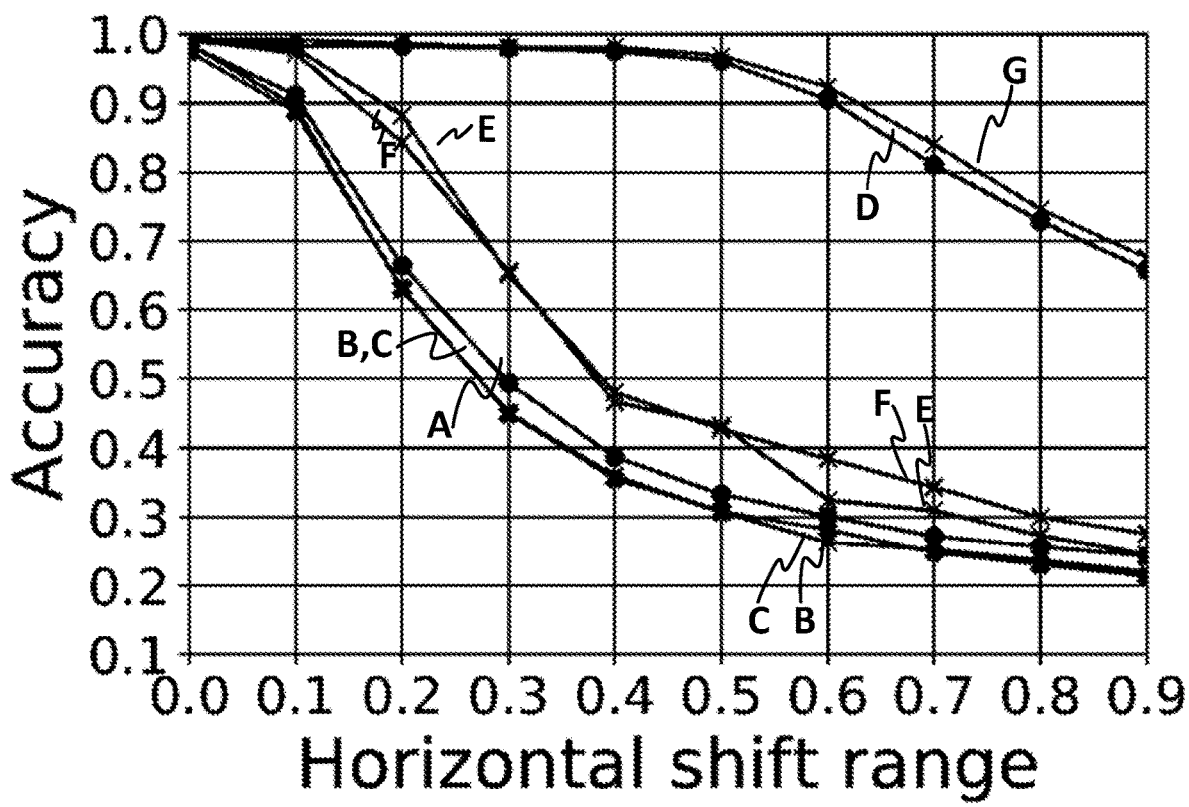
FIG. 16(b) is a plot showing the performance with a horizontal shift.

We show the robustness results of deep CAMA with augmented training in FIG. 16 (cf. FIG. 7). Here shift range 0:5 is used to augment the training data. FIG. 16(a) shows a test vertical shift. FIG. 16(b) shows a test horizontal shift.

Take the vertical shift test in panel 16(a) for example. Similar to adversarial training, when vertically shifted data are in the training set, the test performance without fine-tuning (green line) is significant better. Further, fine-tuning (line F) brings in even larger improvement for large scale shifts. On the other hand, when using horizontally shifted data in training, deep CAMA's robustness on vertically shifted data also improves (line D), which is different from discriminative DNNs overfitting behaviour (FIG. 7). Therefore deep CAMA shows significant advantage over discriminative DNNs as its robustness to unseen manipulations can be improved by observing other related manipulations. Our model does not overfit to a specific type of manipulations, at the same time further fine-tuning can always improve the robustness against new manipulations in the test set (line G). The same conclusion holds in panel 16(b).

ROBUSTNESS TEST ON MEASUREMENT BASED DATA

Our causal view on valid manipulations allows us to test the robustness of models to generic measurement data. Unfortunately, there exists no public dataset with multiple variables where ground truth causal relationships are known. Therefore we generate synthetic data (see appendix) following a causal process, and test the performance of the generic deep CAMA on this measurement based data. Here we use Gaussian variables for A, C and X, and categorical variables for Y. All the ground truth causal relationships are nonlinear (quadratic mainly).

Figure 17A:
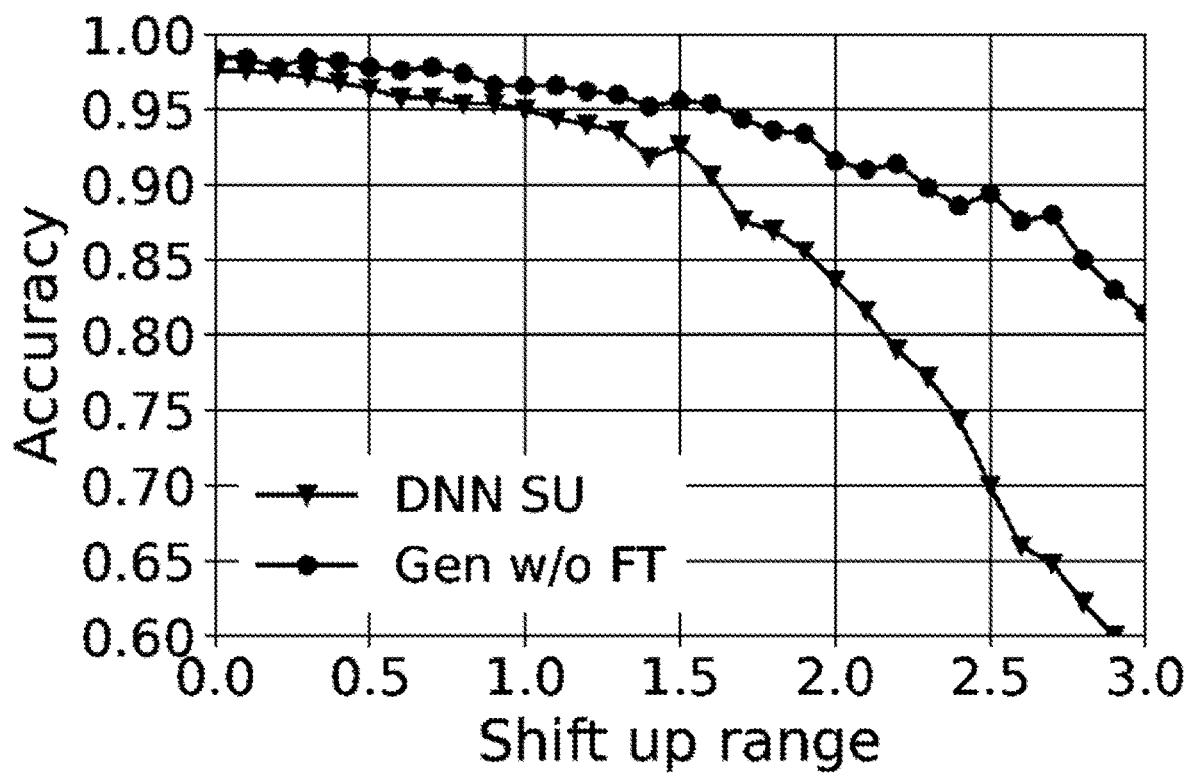
FIG. 17(a) is a plot showing performance in a test with a co-parent manipulation in the form of an upward shift.
Figure 17B:
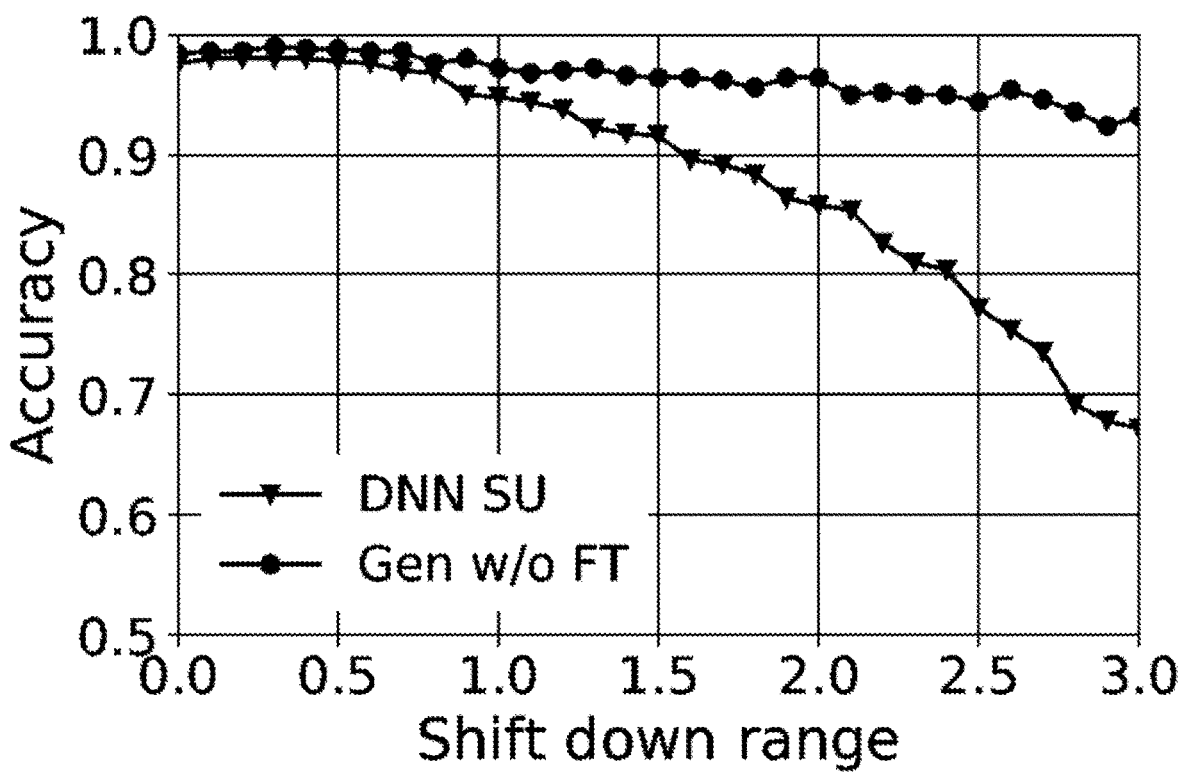
FIG. 17(b) is a plot showing the corresponding performance with a downward shift.

First, we test manipulations on co-parents, C, while keeping the ground truth causal influence from C to X static. Thus, both C and X change. We manipulate C by shifting it up or down, which is a reasonable analogy to the noisiness in measurement data. For example, in medical measurement data, different doctors may have different subjective standards while examining the patients, thus the same measurement can be shifted up or down. FIG. 17 shows the result: compared to a discriminatively trained DNN, deep CAMA is significantly more robust to a wide range of manipulations. FIG. 17(a) shows a manipulation of co-parents in the case of a shift up. FIG. 17(b) shows a manipulation of co-parents in the case of a shift down.

However, when the range of the shifting manipulations increases, the classification accuracy of the discriminative DNN drops drastically. This confirms our theory that manipulations in C do not affect the decision making of deep CAMA, therefore our model is more robust to manipulation on co-parents as compared to discriminative DNNs.

Figure 18A:
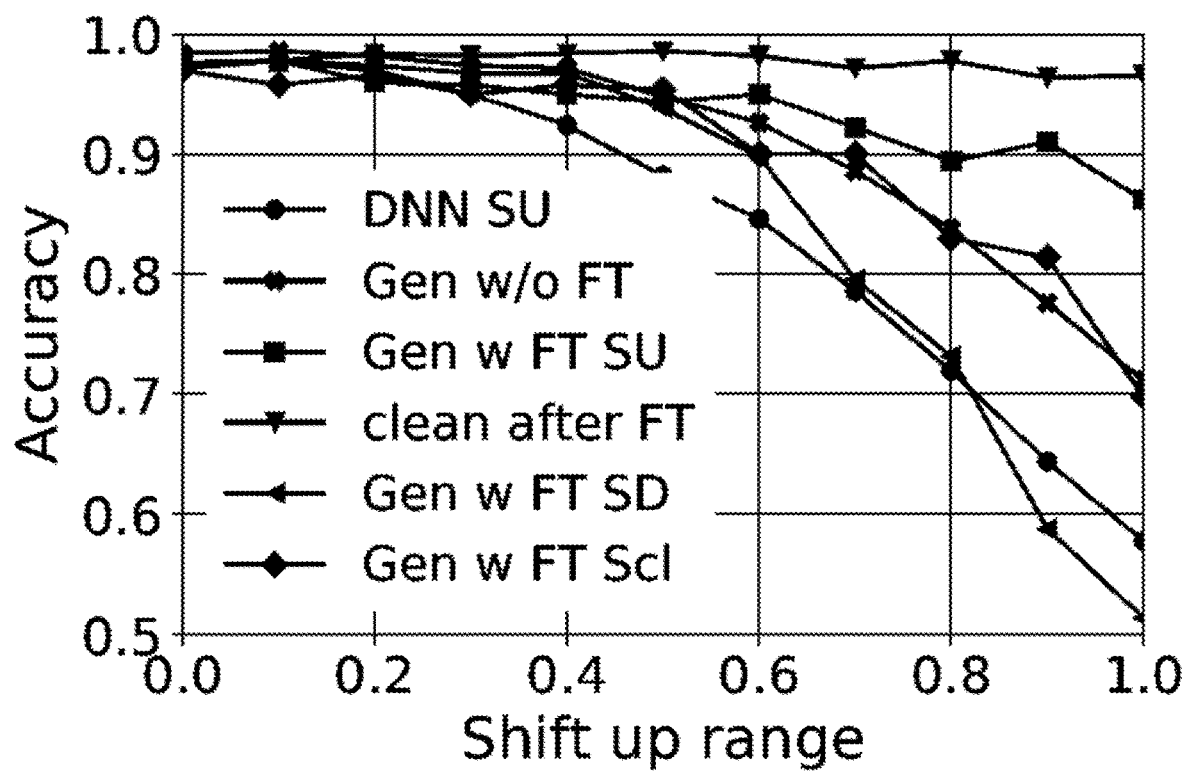
FIG. 18(a) is a plot showing performance in a test with a child manipulation in the form of an upward shift.
Figure 18B:
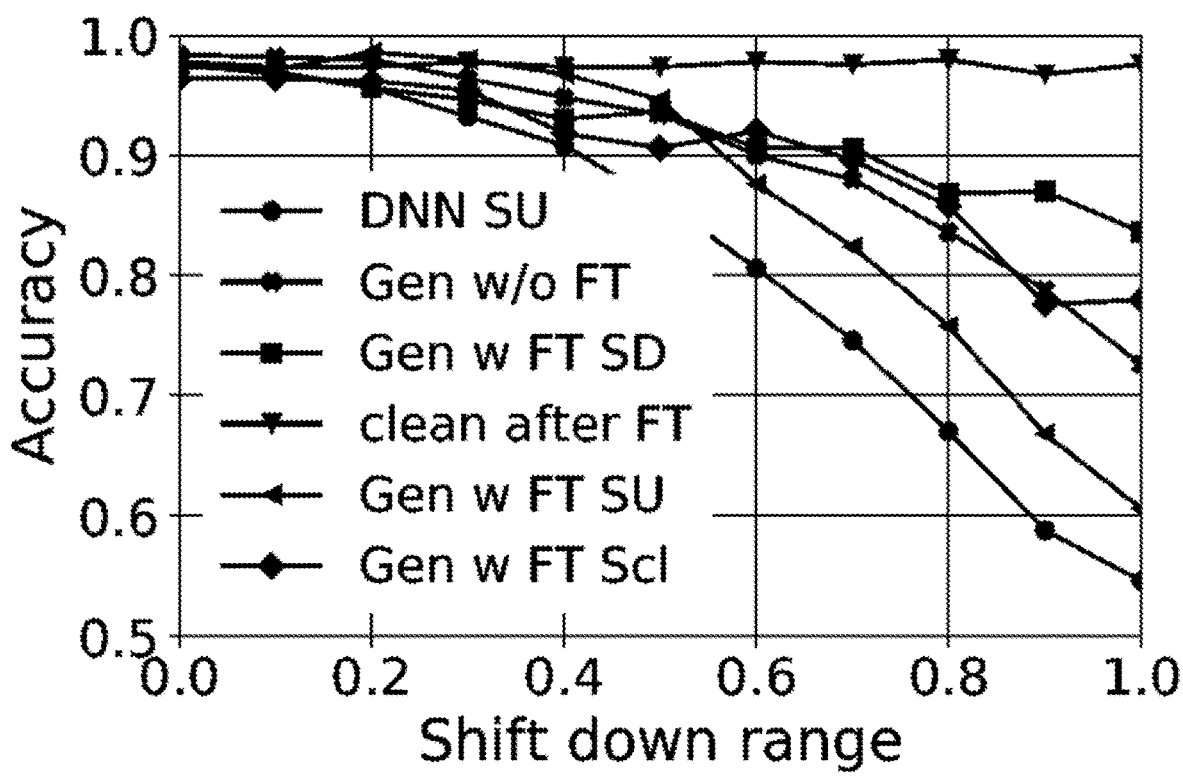
FIG. 18(b) is a plot showing the corresponding performance with a downward shift.

FIG. 18 shows the performance of the generic deep CAMA when the children X are manipulated, and the model only sees clean data at training time. FIG. 18(a) shows a manipulation of children in the case of a shift up. FIG. 18(b) shows a manipulation of children in the case of a shift down.

While deep CAMA achieves the same accuracy as a discriminative DNN on clean data, it is again significantly more robust to manipulations even without fine-tuning (the orange line vs the blue line). With fine-tuning (green line), the robustness of deep CAMA is further improved, especially when the amount of distortion is large. The line with downward-facing triangular points shows that deep CAMA's test accuracy on clean data, which does not drop after fine-tuning on different shifts. This further confirms that during test time, fine-tuning learns the influence of M without affecting the causal relationships between Y and Z.

EXPERIMENTAL SETTINGS

Network Architecture:
MNIST Experiments:
Discriminative DNN: The discriminate model used in the paper contains 4 densely connected hidden layer of [512; 256; 126; 512] width for each layer. ReLU activations and dropout are used with dropout rate [0:25; 0:25; 0:25; 0:5] for each layer.

Deep CAMA's p networks: we use dim(Y)=10; dim(Z)=64 and dim(M)=32. $NN^p_Y$: an MLP of layer sizes [dim(Y); 500; 500] and ReLU activations. $NN^p_Z$: an MLP of layer sizes [dim(Z); 500; 500] and ReLU activations. $NN^p_M$: an MLP of layer sizes [dim(M); 500; 500] and ReLU activations. $NN^p_{merge}$: a projection layer which projects the feature outputs from the previous networks to a 3D tensor of shape (4; 4; 64), followed by 3 deconvolutional layers with stride 2, SAME padding, filter size (3; 3; 64; 64) except for the last layer (3; 3; 64; 1). All the layers use ReLU activations except for the last layer, which uses linear activation.

Deep CAMA's q networks:
$NN^q_M$: it starts from a convolutional neural network (CNN) with 3 blocks of {conv3×3, max-pool} layers with output channel size 64, stride 1 and SAME padding, then performs a reshape-to-vector operation and transforms this vector with an MLP of layer sizes [4×4×64, 500, dim(M)×2] to generate the mean and log-variance of q(m|x). All the layers use ReLU activation except for the last layer, which uses linear activation. $NN^q_Z$: first it uses a CNN with similar architecture as $NN^q_M$ CNN (except that the filter size is 5) to process x. Then after the reshape-to-vector operation, the vector first gets transformed by an MLP of size [4×4×64, 500], then it gets combined with y and m and passed through another MLP of size [500+dim(Y)+dim(M), 500, dim(Z)×2] to obtain the mean and log-variance of q(z|x, y, m). All the layers use ReLU activation except for the last layer, which uses linear activation.

Measurement Data Experiments:

Discriminative DNN: The A, C, X variables are concatenated to an input vector of total dimension 20. Then the DNN contains 3 densely connected hidden layer of [64, 16, 32] width for each layer, and output Y. ReLU activations and dropout are used with dropout rate [0:25; 0:25; 0:5] for each layer.

Deep CAMA's p networks: we use dim(Y)=5, dim(A)=5, dim(C)=5, dim(Z)=64 and dim(M)=32. p(y|a): an MLP of layer sizes [dim(A), 500, 500, dim(Y)], ReLU activations except for the last layer (softmax). p(x|y, c, z, m) contains 5 networks: 4 networks $\{NN^p_Y, NN^p_C, NN^p_Z, NN^p_M\}$ to process each of the parents of X, followed by a merging network. $NN^p_Y$: an MLP of layer sizes [dim(Y), 500, 500] and ReLU activations. $NN^p_C$: an MLP of layer sizes [dim(C); 500; 500] and ReLU activations. $NN^p_Z$: an MLP of layer sizes [dim(Z), 500, 500] and ReLU activations. $NN^p_M$: an MLP of layer sizes [dim(M), 500, 500] and ReLU activations. $NN^p_{merge}$: it first start from a concatenation of the feature outputs from the above 4 networks, then transforms the concatenated vector with an MLP of layer sizes [500×4, 500, dim(X)] to output the mean of x. All the layers use ReLU activations except for the last layer, which uses linear activation.

Deep CAMA's q networks: q(m|x): it uses an MLP of layer sizes [dim(X); 500; 500; dim(M) 2] to obtain the mean and log-variance. All the layers use ReLU activations except for the last layer, which uses linear activation. q(z|x, y, m, a, c): it first concatenates x, y, m, a, c into a vector, then uses an MLP of layer sizes [dim(X)+dim(Y)+dim(M)+dim(A)+dim(C), 500, 500, dim(Z)×2] to transform this vector into the mean and log-variance of q(z|x, y, m, a, c). All the layers use ReLU activations except for the last layer, which uses linear activation.

Measurement data generation: we set the target Y to be categorical, its children, co-parents and parents are continuous variables. The set 5 classes for Y, and Y has 10 children variables and 5 co-parents variables, also one 5 dimensional parents. Parents (A) and co-parents (C) are generated by sampling from a normal distribution. We generate Y using structured equation Y=fy(A)+σY. We use fy=argmax g(A) and g( ) is a quadratic function 0.2*A2-0.8A. σY is the Gaussain noise. To generate the children X=f(Y, C)+σx, we also used quadratic function f and the parameters were sampled from a Gaussian distribution. As in the experiment, we were using fixed scale shift, we also added a normalize the children before adding the Gaussian random noise σx. So that all observations are in similar scale.

Other: for MNIST experiments, we uses 5% of the training data as the validation set. We used the training results with the highest validation accuracy for testing. For the experiments with measurement data. We generated 1000 data in total. We split, 500 data for testing, 450 for training and 50 for validation. We used the training results with the highest validation accuracy for testing for both deep CAMA and for DNN.

CONCLUSION

We have provided a causal view on the robustness of neural networks, showing that the vulnerability of discriminative DNNs is due to the lack of causal reasoning. We defined valid manipulations under this causal view, which are the manipulations on the children and/or the co-parents of the target variables, independent of the target and/or the cause of the target. We further proposed a deep causal manipulation augmented model (deep CAMA), which follows the causal relationship in the model design, and can be adapted to unseen manipulations at test time. Our model has demonstrated improved robustness, even without adversarial training. When manipulated data are available, our model's robustness increases for both seen and unseen manipulation.

Our framework is generic, however, manipulations can change over time, and a robust model should adapt to these perturbations in a continuous manner. Our framework thus should be adapted to online learning or continual learning settings. In future work, we will explore the continual learning setting of deep CAMA where new manipulations come in a sequence.

It will be appreciated that the above embodiments have been described by way of example only.

More generally, according to one aspect disclosed herein, there is provided computer-implemented method of machine learning, the method comprising: receiving a plurality of observed data points each comprising a respective vector of feature values, wherein for each observed data point, the respective feature values are values of a plurality of different features of a feature vector, and each observed data point represents a respective observation of a ground truth as observed in the form of the respective values of the feature vector; and learning parameters of a machine-learning model based on the observed data points, wherein the machine-learning model comprises one or more statistical models arranged to model a causal relationship between the feature vector and a latent vector, a classification, and a manipulation vector, the manipulation vector representing an effect of potential manipulations occurring between the ground truth and the observation of the group truth as observed via said feature vector, wherein the learning comprises learning parameters of the one or more statistical models to map between the feature vector, latent vector, classification and manipulation vector.

In embodiments, the learning comprises at least a training phase wherein each of the data points used in the training phase further comprises a respective value of the classification.

Alternatively the method could use a reinforcement approach or an unsupervised approach.

In embodiments, the observed data points may comprise a first group of the data points which do not include the effect of at least one manipulation, and a second group of said data points which do include the effect of the at least one manipulation.

The data points not including the manipulation (i.e. the first group) may be referred to herein as "clean" data. The data points including the manipulation (i.e. the second group) may be referred to herein as "noisy" data.

In embodiments, the learning further may comprise a fine-tuning phase following the training phase, wherein each of the data points used in the training phase is not labelled with a value of the classification. The data points used in the training phase may comprise the first group, and the data points used in the fine-tuning phase may comprise the second group.

Alternatively or additionally, it is not excluded for example that the data points used in the training phase also comprise a mix of "clean" data points and data points including one or more manipulations.

The fine-tuning phase may for example comprise a testing phase, or a phase of ongoing learning during deployment of the machine-learning model in-the-field, i.e. in an actual application.

The learning during the fine-tuning phase may for example be based on a reinforcement approach or an unsupervised approach.

In embodiments the method may comprise, deploying and using the machine-learning model in an application in-the-field, wherein said use comprises receiving at least one target data point comprising a respective vector of feature values for the feature vector, and using the machine-learning model to predict a value of the classification for the at least one target data point, wherein the second group of data points include the at least one target data point. In the testing phase for a new data point, although the target classification is not given, a fine-tuning is nonetheless performed which means the manipulated vector is learned considering all possible classes. For example the classification may be performed though Bayes rule after learning the manipulation vector.

In embodiments, the feature vector may represent an and the at least one manipulation may comprise one or more of: a rotation, a lateral translation, a light level, a camera setting such as exposure, a blurring, a quantization, image compression, and/or a missing part of the image (e.g. due to an obstruction). Alternatively or additionally, the feature vector may represent audio content and the at least one manipulation may comprise one or more of: a shift in frequency, a quantization, audio compression, and/or audible interference. As another alternative or additional possibility, the feature vector may comprise a representation of natural language content and the at least one manipulation may comprise one or more of: replacement of one or more words or phrases with synonymous language, a translation of one or more words or phrases into a different natural language, and/or a conversion of one or more words or phrases into a different linguistic representation such as a short-hand. As yet another alternative or additional possibility, the at least one manipulation may comprise random noise.

In embodiments, the statistical models may comprise one or more first statistical models and one or more second statistical models, wherein the one or more second statistical models are arranged to model the causal relationship between the manipulation vector and the feature vector. This means that each of the one or more second statistical models takes the manipulation vector as an input if arranged as generative model, or has the manipulation vector as an output if arranged as an inference network.

In embodiments, each of the one or more first statistical models may be arranged to model a causal relationship between properties of the ground truth represented by the classification and/or latent vector and the feature vector. This means that each of the one or more first statistical models takes at least one of the classification and latent vector as an input if arranged as a generative model, or has at least one of the classification and latent vector as an output if arranged as an inference network.

In embodiments each of the one or more second statistical models may only model the causal relationship between the manipulation vector and the feature vector, not the causal relationship between the properties represented by the classification nor latent vector and the feature vector. In embodiments, at least one of the first statistical models may be arranged only to model the causal relationship between the properties represented by the classification and/or latent vector and the feature vector, not the relationship between the manipulation vector and the feature vector. Alternatively or additionally, at least one of the first statistical models may be arranged to model a causal relationship between a combination of said properties and manipulation vector, and the feature vector.

In embodiments, a) when learning based on the first group of data points, the manipulation vector may be set to a null value, and the parameters of the one or more first statistical models may be learned whilst the parameters of the one or more second statistical models may be fixed. Whereas b) when learning based on the second group of data points, the manipulation vector may either be set to a known value representing the at least one manipulation if known or the manipulation vector may be inferred if the at least one manipulation is not known, and the parameters of the at least one or more second statistical models may be learned.

When learning based on the second group of data points, the parameters of any given one of the one or more second statistical models may either be fixed or learned as well.

In embodiments, the one or more statistical models may comprise one or more generative models mapping from the classification, latent vector and manipulation vector as inputs to the feature vector as an output; the learning comprising learning parameters of the one or more generative models which map the classification, latent vector and manipulation vector to the feature vector.

In embodiments, the one or more first statistical models may comprise a first one or more of said generative models which take the latent vector and classification but not the manipulation vector as respective inputs. The one or more second statistical models may comprise a second, separate one of said generative models which takes the manipulation vector as a respective input but not the latent vector nor the classification. Each of the first and second generative models may be configured to map its respective input to a respective output, the outputs of the first and second generative models being mapped to the feature vector.

In embodiments, the first generative models may comprise a generative model taking the classification as a respective input but not the latent vector nor the manipulation vector, and a separate generative model which takes the latent vector as an input but not the classification nor the manipulation vector.

In embodiments, the first statistical models may further comprise another of said generative models arranged as a merging generative model, mapping the outputs of the first and second generative networks to the feature vector via the merging generative model.

In embodiments, a) when learning based on the first group of data points, the parameters of the one or more first generative models and the merging generative model may be learned, whilst the parameters of the generative model in the second branch may be fixed. Whereas b) when learning based on the second group of data points, the parameters of at least the second generative model may be learned.

In embodiments, when learning based on the first group of data points, the parameters of the merging generative model may also be learned. When learning based on the second group of data points, the parameters of the merging generative model may be learned in this phase as well. When learning based on the second group of data points, the parameters of the one or more first generative models may be fixed.

In embodiments, the one or more statistical models may comprise one or more inference models mapping from the classification, feature vector and manipulation vector as inputs to the latent vector as an output. In this case the learning may comprise learning parameters of the one or more inference models which map the classification, feature vector and manipulation vector to the latent vector.

In embodiments, the one or more inference models and the one or more generative models may thus form an encoder and decoder respectively of an auto encoder, e.g. a variational auto encoder.

In embodiments, the one or more first statistical models may comprise at least a first of said inference models mapping from the classification, feature vector and manipulation vector to the latent vector.

In embodiments, the one or more second statistical models may comprise at least a second, separate one of said inference mapping from the feature vector to the manipulation vector.

In embodiments, a) when learning based on the first group of data points, the parameters of the at least one first inference model may be learned whilst the parameters of the second inference model may be fixed. Whereas b) when learning based on the second group of data points, the parameters of the both the first and second inference models may be learned.

In embodiments, the one or more statistical models may further include: a co-parent vector modelling a circumstance occurring within an environment of the ground truth having a similar effect to the ground truth, and/or a parent vector modelling a parent cause of the classification.

In embodiments, the first generative models may comprise a separate respective generative model for each of the of the classification, the latent vector and the co-parent vector, each respective generative model taking a respective one of these as an input and each having a respective output. In this case the merging generative model maps all of these outputs and the output of the second generative model to the feature vector.

In embodiments, the at least one first inference model may be arranged to map from the classification, feature vector, manipulation vector and co-parent vector to the latent vector.

In embodiments the generative models may further comprise a parent generative model mapping from the parent vector to the classification.

In embodiments, each of any one, some or all of said statistical models may be a neural network, the parameters of that network being weights.

In embodiments, this may comprise each of any one, more or all of the one or more generative models being a generative network; and/or each of any one, more or all of the one or more inference models being an inference network. In this case the parameters comprise weights of the one or more generative networks and/or inference networks. The weights applied by some or all of the nodes in such networks may each be modelled as a scalar or as a probabilistic distribution. Some or all of the connections between nodes may each be modelled as a scalar or as a probabilistic distribution.

According to another aspect disclosed herein, there is provided a computer-implemented method of using a trained machine-learning model to make predictions, wherein: the machine-learning model comprises one or more statistical models providing a mapping between a feature vector, a latent vector, a classification, and a manipulation vector modelling an effect of at least one manipulation occurring between the ground truth and the observation of the group truth as observed via said feature vector, wherein the training comprises learning said mapping; and the method comprises receiving at least one data point comprising a set of feature values for the feature vector, using the trained machine-learning model to predict a value of the classification for the at least one data point.

According to another aspect disclosed herein, there may be provided a computer program embodied on computer-readable storage, the program comprising code configured so as when run on one or more processors to perform the operations of any method disclosed herein.

According to another aspect disclosed herein, there is provided a computer system comprising: storage comprising one or more memory units, and processing apparatus comprising one or more processing units; wherein the storage stores code arranged to run on the processing apparatus, the code being configured so as when thus run to perform the operations of any method disclosed herein.

Other variants and applications of the disclosed techniques may become apparent to a skilled person once given the disclosure herein. The scope of the present disclosure is not limited by the described embodiments but only by the accompanying claims.

The invention claimed is:

1. A computer-implemented method of machine learning, the method comprising:
  receiving a feature vector that represents an observation of a ground truth as observed in the form of values of the feature vector;
  learning a parameter of an inference model based on the observed values of the feature vector; and
  modeling, with the inference model, a causal relationship between the feature vector and a manipulation vector, the inference model including a mapping from a classification, the feature vector, and the manipulation vector as inputs to a latent vector as an output, the manipulation vector representing an effect of a potential manipulation occurring between the ground truth and the observation of the ground truth as observed via said feature vector, the potential manipulation comprising manipulation of one or more of an image, audio content, natural language content.

2. The method of claim 1, wherein the learning comprises at least a training phase wherein the feature vector comprises a value of the classification.

3. The method of claim 1, wherein the feature vector comprises a first group of feature vectors which do not include the effect of at least one manipulation, and a second group of feature vectors which do include the effect of the at least one manipulation.

4. The method of claim 3, wherein:
  the learning comprises at least a training phase wherein the feature vectors of the first group comprise a value of the classification; and
  the learning further comprises a fine-tuning phase following the training phase, wherein the feature vectors of the second group are not labelled with a value of the classification.

5. The method of claim 4, wherein:
  when learning based on the first group of feature vectors, the manipulation vector is set to a null value, and a parameter of a first statistical model is learned whilst a parameter of a second statistical model is fixed; and
  when learning based on the second group of feature vectors, the manipulation vector is set to a known value representing the at least one manipulation when known or the manipulation vector is inferred when the at least one manipulation is not known, and the parameter of the second statistical model is learned.

6. The method of claim 1, wherein a generative model maps from the classification, the latent vector, and the manipulation vector as inputs to the feature vector as an output; and the learning comprising learning a parameter of the generative model which maps the classification, latent vector, and manipulation vector to the feature vector.

7. The method of claim 6, wherein:
a first statistical model comprises a first of the generative model which takes the latent vector and classification but not the manipulation vector as a respective input; a second statistical model comprises a second, separate one of the generative model which takes the manipulation vector as a respective input but not the latent vector nor the classification; and
wherein each of the first and second generative models is configured to map its respective input to a respective output, the outputs of the first and second generative models being mapped to the feature vector.

8. The method of claim 7, wherein:
the first generative model comprises a generative model taking the classification as a respective input but not the latent vector nor the manipulation vector, and a separate generative model which takes the latent vector as an input but not the classification nor the manipulation vector.

9. The method of claim 7, wherein the first statistical model comprises another of said generative models arranged as a merging generative model, mapping the outputs of first and second generative networks to the feature vector via the merging generative model.

10. The method of claim 7, wherein:
the feature vector comprises a first group of feature vectors which do not include the effect of at least one manipulation, and a second group of feature vectors which do include the effect of the at least one manipulation;
the learning comprises at least a training phase wherein the feature vectors of the first group comprise a value of the classification;
the learning further comprises a fine-tuning phase following the training phase, wherein the feature vectors of the second group are not labelled with a value of the classification; and:
when learning based on the first group of feature vectors, the manipulation vector is set to a null value, and a parameter of the first generative model is learned, whilst a parameter of the second generative model is fixed; and
when learning based on the second group of feature vectors, the manipulation vector is set to a known value representing the at least one manipulation when known or the manipulation vector is inferred when the at least one manipulation is not known, and the parameter of at least the second generative model is learned.

11. The method of claim 1, wherein:
a second statistical model is arranged to model the causal relationship between the manipulation vector and the feature vector; and
a first statistical model comprises the inference model mapping from the classification, the feature vector, and the manipulation vector to the latent vector.

12. The method of claim 11, wherein the second statistical model comprises at least a second, separate one of said inference models mapping from the feature vector to the manipulation vector.

13. The method of claim 1, wherein the inference model includes:

a co-parent vector modelling a circumstance occurring within an environment of the ground truth having a similar effect to the ground truth, and/or
a parent vector modelling a parent cause of the classification.

14. The method of claim 1, wherein the inference model comprises a neural network, in which the parameter is a weight.

15. The method of claim 1, wherein the features represent pixels of an image and the potential manipulation comprises one or more of rotation, lateral translation, lighting conditions, a camera setting used to capture the image, a part of the image being missing or obstructed, optical blurring, quantization noise, image compression, random noise.

16. The method of claim 1, wherein the features represent audio content and the potential manipulation comprises one or more of a shift in frequency, quantization, audio compression, audible interference, random noise.

17. The method of claim 1, wherein the features comprise a representation of natural language content and the potential manipulation comprises one or more of replacement of one or more words or phrases with synonymous language, translation of one or more words or phrases into a different natural language, a conversion of one or more words or phrases into a different linguistic representation.

18. A computer device embodied on computer-readable storage, the device comprising code configured so as when run on one or more processors to perform operations of:
receiving a feature vector that represents an observation of a ground truth as observed in the form of values of the feature vector;
learning a parameter of an inference model based on the observed values of the feature vector; and
modeling, with the inference model, a causal relationship between the feature vector and a manipulation vector, the inference model including a mapping from a classification, the feature vector, and the manipulation vector as inputs to a latent vector as an output, the manipulation vector representing an effect of a potential manipulation occurring between the ground truth and the observation of the ground truth as observed via said feature vector, the potential manipulation comprising manipulation of one or more of an image, audio content, natural language content.

19. The computer device of claim 18, wherein the features represent one or more of:
pixels of an image, audio content, a representation of natural language content; the potential manipulation comprising one or more of: rotation, lateral translation, lighting conditions, a camera setting used to capture the image, a part of the image being missing or obstructed, optical blurring, quantization noise, image compression, random noise, a shift in frequency, quantization, audio compression, audible interference, replacement of one or more words or phrases with synonymous language, translation of one or more words or phrases into a different natural language, a conversion of one or more words or phrases into a different linguistic representation.

20. A computer system comprising:
storage comprising one or more memory units, and
processing apparatus comprising one or more processing units;
wherein the storage stores code arranged to run on the processing apparatus, the code being configured so as when thus run to perform operations of:

receiving a plurality of observed data points each comprising a respective vector of feature values, wherein for each observed data point, the respective feature values are values of a plurality of different features of a feature vector, and each observed data point represents a respective observation of a ground truth as observed in the form of the respective values of the feature vector; and learning parameters of an inference model based on the observed data points, wherein the inference model comprises one or more statistical models arranged to model a causal relationship between the feature vector and a manipulation vector, the inference model including a mapping from a classification, the feature vector, and the manipulation vector as inputs to a latent vector as an output, the manipulation vector representing an effect of potential manipulations occurring between the ground truth and the observation of the ground truth as observed via said feature vector;

wherein I) the features represent pixels of an image and the potential manipulations comprise a rotation, lateral translation, lighting conditions, a camera setting used to capture the image, a part of the image being missing or obstructed, optical blurring, quantization noise, image compression or random noise; or II) the features represent audio content, and the potential manipulations comprise a shift in frequency, quantization, audio compression audible interference or random noise;

wherein the observed data points comprise a first group of the data points which do not include the effect of at least one of the manipulations, and a second group of said data points which do include the effect of the at least one of the manipulations; wherein the inference model comprises one or more first statistical models and one or more second statistical models, wherein the one or more second statistical models are arranged to model the causal relationship between the manipulation vector and the feature vector; and wherein:

a) when learning based on the first group of data points, the manipulation vector is set to a null value, and the parameters of the one or more first statistical models are learned whilst the parameters of the one or more second statistical models are fixed, whereas b) when learning based on the second group of data points, the manipulation vector is either set to a known value representing the at least one of the manipulations if known or the manipulation vector is inferred if the at least one of the manipulations is not known, and the parameters of the at least one or more second statistical models are learned.

* * * * *